United States Patent
Shen et al.

(10) Patent No.: US 12,225,038 B2
(45) Date of Patent: Feb. 11, 2025

(54) PREDICTING DATA TAMPERING USING AUGMENTED MACHINE LEARNING MODELS

(71) Applicant: EQUIFAX INC., Atlanta, GA (US)

(72) Inventors: Cuizhen Shen, Duluth, GA (US);
Philip Munguia, Atlanta, GA (US);
Prateek Agrawal, Alpharetta, GA (US);
Ledao Chen, Roswell, GA (US);
Sriram Tirunellayi, Duluth, GA (US)

(73) Assignee: Equifax Inc., Atlanta, GA (US)

( * ) Notice: Subject to any disclaimer, the term of this patent is extended or adjusted under 35 U.S.C. 154(b) by 700 days.

(21) Appl. No.: 17/037,561

(22) Filed: Sep. 29, 2020

(65) Prior Publication Data

US 2022/0103589 A1 Mar. 31, 2022

(51) Int. Cl.
*H04L 9/40* (2022.01)
*G06F 16/21* (2019.01)
(Continued)

(52) U.S. Cl.
CPC ........ *H04L 63/1433* (2013.01); *G06F 16/219* (2019.01); *G06F 21/64* (2013.01);
(Continued)

(58) Field of Classification Search
CPC ... H04L 63/1433; H04L 67/01; G06F 16/219; G06F 21/64; G06F 40/40; G06F 21/6272;
(Continued)

(56) References Cited

U.S. PATENT DOCUMENTS 10,867,303 B1 * 12/2020 Manapat ............... G06Q 10/067
11,038,862 B1 * 6/2021 Davis .................... H04L 63/105
(Continued)

FOREIGN PATENT DOCUMENTS

WO 2019090519 A1 5/2019

OTHER PUBLICATIONS

"Autoencoders", Unsupervised Feature Leaning and Deep Learning Tutorial, Stanford University, Available Online at: http://ufldl.stanford.edu/tutorial/unsupervised/Autoencoders/, Accessed from Internet on Sep. 24, 2020, 5 pages.
(Continued)

*Primary Examiner* — Mohammad W Reza
*Assistant Examiner* — Carlton Johnson
(74) *Attorney, Agent, or Firm* — Kilpatrick Townsend & Stockton LLP

(57) ABSTRACT

Certain aspects involve using a set of machine learning modeling models for predicting attempts to tamper with records using a fraudulent dispute. A tampering prediction system receives a request from a target entity to modify event data for a historical event, including information about the target entity and the event. The system generates a first score by applying a first set of machine learning models to the information from the request and information about the target entity obtained from a database. They system computes a second score by applying a second machine learning model to event data retrieved from the database. The second machine learning model has been trained using labeled training data and is augmented with a model that has been trained using unlabeled training data. The system generates an overall score for the request based on the first score and the second score.

20 Claims, 6 Drawing Sheets

(51) Int. Cl.
    *G06F 21/64*     (2013.01)
    *G06F 40/40*     (2020.01)
    *G06N 20/00*     (2019.01)
    *G06V 30/414*     (2022.01)
    *H04L 67/01*     (2022.01)
    *G06V 30/10*     (2022.01)

(52) U.S. Cl.
    CPC ............. *G06F 40/40* (2020.01); *G06N 20/00* (2019.01); *G06V 30/414* (2022.01); *H04L 67/01* (2022.05); *G06V 30/10* (2022.01)

(58) Field of Classification Search
    CPC .... G06F 21/6245; G06N 20/00; G06N 3/045; G06N 7/01; G06N 3/084; G06N 5/01; G06V 30/414; G06V 30/10; G06Q 40/03; G06Q 10/0635; G06Q 30/018
    See application file for complete search history.

(56) References Cited

U.S. PATENT DOCUMENTS

| | | | |
|---|---|---|---|
| 11,470,106 B1* | 10/2022 | Lin | ................. H04L 63/1433 |
| 2019/0236695 A1 | 8/2019 | McKenna et al. | |
| 2019/0378051 A1 | 12/2019 | Widmann et al. | |
| 2020/0068031 A1* | 2/2020 | Kursun | ................. H04W 24/02 |
| 2020/0137110 A1* | 4/2020 | Tyler | ................. H04L 63/1483 |
| 2022/0046045 A1* | 2/2022 | Rao | ................. G06F 21/577 |

OTHER PUBLICATIONS

Chen, et al., "XGBoost: A Scalable Tree Boosting System", Proceedings of the 22nd Association for Computing Machinery Special Interest Group on Knowledge Discovery International Conference on Knowledge Discovery and Data Mining, Aug. 2016, 13 pages.
Koehrsen, "A Conceptual Explanation of Bayesian Hyperparameter Optimization for Machine Learning", Data Science, Available Online at: https://towardsdatascience.com/a-conceptual-explanation-of-bayesian-model-based-hyperparameter-optimization-for-machine-learning-b8172278050f, Jun. 24, 2018, 15 pages.
Zhou, et al., "Ensembling Neural Networks: Many Could Be Better Than All", Artificial Intelligence, vol. 137, Nos. 1-2, May 2002, pp. 1-23.
PCT/US2021/071607, "International Search Report and Written Opinion", Jan. 10, 2022, 12 pages.

* cited by examiner

US 12,225,038 B2

PREDICTING DATA TAMPERING USING AUGMENTED MACHINE LEARNING MODELS

TECHNICAL FIELD

The present disclosure relates generally to computer security and artificial intelligence. More specifically, but not by way of limitation, this disclosure relates to systems that apply a set of machine learning models to data received in a record modification request to generate data tampering predictions that can impact machine-implemented operating environments.

BACKGROUND

In cybersecurity systems and other systems for detecting unauthorized activity or ingenuine activity, machine learning techniques can be used to perform one or more functions (e.g., acquiring, processing, analyzing, and understanding various inputs in order to produce an output that includes numerical or symbolic information). In one example, a computer system programmed with a machine learning model can learn from training data and thereby perform a future task that involves circumstances or inputs similar to the training data. As another example, a computer system programmed with machine learning models can collect data and detect unusual or abnormal patterns, and perform a future task in response to circumstances or inputs that are different from what occurred in the past. Such a computer system can be used, for example, to recognize certain individuals or objects in an image, to learn individual patterns from texts, to simulate or predict future actions based on a pattern of interactions to a given individual, etc. Such machine learning techniques can be used, for example, to detect or prevent unauthorized activity with respect to computing environments or other systems.

SUMMARY

Certain aspects involve using machine learning modeling algorithms for predicting data tampering. For example, a system comprises a server computer comprising one or more processors; one or more non-transitory memories coupled to the one or more processors, the one or more memories storing: a database comprising event data for a plurality of historical events associated with a plurality of target entities; and a plurality of instructions executable by the one or more processors, the plurality of instructions comprising instructions that when executed by the one or more processors cause the one or more processors to perform processing comprising: receiving a request from a target entity to modify event data for a historical event, the request comprising information about the target entity and information about the historical event; generating a first security assessment score by, at least, applying a first set of machine learning models to the information about the target entity obtained from the request, the information about the historical event, and information about the target entity obtained from the database; retrieving, from the database, event data associated with prior event data modification requests made by the target entity; computing a second security assessment score by, at least, applying a second machine learning model to the retrieved event data, wherein the second machine learning model has been trained using labeled training data of the event data, and wherein the second machine learning model is augmented with an optimization model that has been trained using unlabeled training data of the event data; generating an overall security assessment score for the request based on the first security assessment score and the second security assessment score; and providing the overall security assessment score for the request to a client computer; and the client computer, wherein the client computer is configured for preventing, based on the overall security assessment score, the target entity from accessing a resource.

In some aspects, preventing the target entity from accessing the resource includes one or more of: preventing the target entity from accessing a secure database, preventing the target entity from accessing a secured portion of a website, or preventing the target entity from accessing a particular tool in an online environment.

In some aspects, the processing further comprises training the second machine learning model by: obtaining the labeled training data; training the second machine learning model using the labeled training data; obtaining the unlabeled training data; training the optimization model using the unlabeled training data; and optimizing hyperparameters of the second machine learning model using the optimization model.

In some aspects, the processing further comprises identifying, from the database, additional historical event data associated with the outcome of prior requests made by the target entity; applying a third machine learning model to the additional historical event data to compute a third security assessment score, wherein the third machine learning model has been trained using the labeled training data, and wherein the third machine learning model is augmented with a second optimization model that has been trained using the unlabeled training data; and wherein the third machine learning model further bases the overall security assessment score on the third security assessment score.

In some aspects, the request further includes information about a location of origin of the request; and applying the first set of machine learning models to generate the first security assessment score further comprises: applying a fourth machine learning model to the location information to generate first risk signals; and applying a fifth machine learning model to the information about the target entity obtained from the database and the information about the target entity obtained from the request to generate second risk signals; wherein the first security assessment score is generated by applying a sixth machine learning model to the first risk signals and the second risk signals. In some aspects, the information about the historical event includes a narrative description of the historical event; and applying the first set of machine learning models to generate the first security assessment score further comprises: executing optical character recognition on the narrative description of the historical event to extract information from the narrative description of the historical event; and performing natural language processing on the extracted information to generate third risk signals, wherein the first security assessment score is further based on the third risk signals.

In some aspects, the request further includes a supplemental document; and applying the first set of machine learning models to generate the first security assessment score further comprises: executing optical character recognition on the supplemental document to extract information from the supplemental document; and based on the information extracted from the supplemental document, generating fourth risk signals, wherein the first security assessment score is further based on the fourth risk signals. In some aspects, the sixth machine learning model has been trained using labeled risk signal data, and the sixth machine learning model is augmented with an optimization model that has been trained using unlabeled risk signal data.

In some aspects, a computer-implemented method comprises receiving, by a server computer, a request from a target entity to modify event data for a historical event, of a plurality of historical events associated with a plurality of target entities stored to a database, the request comprising information about the target entity and information about the historical event; generating, by the server computer, a first security assessment score by, at least, applying a first set of machine learning models to the information about the target entity obtained from the request, the information about the historical event, and information about the target entity obtained from the database; retrieving, by the server computer from the database, event data associated with prior requests made by the target entity; computing, by the server computer, a second security assessment score by at least applying a second machine learning model to the retrieved event data associated with the prior requests made by the target entity, wherein the second machine learning model has been trained using labeled training data of the event data, and wherein the second machine learning model is augmented with an optimization model that has been trained using unlabeled training data of the event data; generating, by the server computer, an overall security assessment score for the request based on the first security assessment score and the second security assessment score; and providing, by the server computer, the overall security assessment score for the request to a client computer, wherein the overall security assessment score is usable by the client computer for preventing the target entity from accessing a resource.

In some aspects, a non-transitory computer-readable medium stores program code executable by one or more processing devices, wherein the program code, when executed by the one or more processing devices, configures the one or more processing devices to perform operations comprising: receiving a request from a target entity to modify event data for a historical event, of a plurality of historical events associated with a plurality of target entities stored to a database, the request comprising information about the target entity and information about the historical event; generating a first security assessment score by, at least, applying a first set of machine learning models to the information about the target entity obtained from the request, the information about the historical event, and information about the target entity obtained from the database; retrieving, from the database, event data associated with prior requests made by the target entity; computing a second security assessment score by, at least, applying a second machine learning model to the retrieved event data associated with the prior requests made by the target entity, wherein the second machine learning model has been trained using labeled training data of the event data, and wherein the second machine learning model is augmented with an optimization model that has been trained using unlabeled training data of the event data; generating an overall security assessment score for the request based on the first security assessment score and the second security assessment score; and providing the overall security assessment score for the request to a client computer.

DETAILED DESCRIPTION

Figure 1:
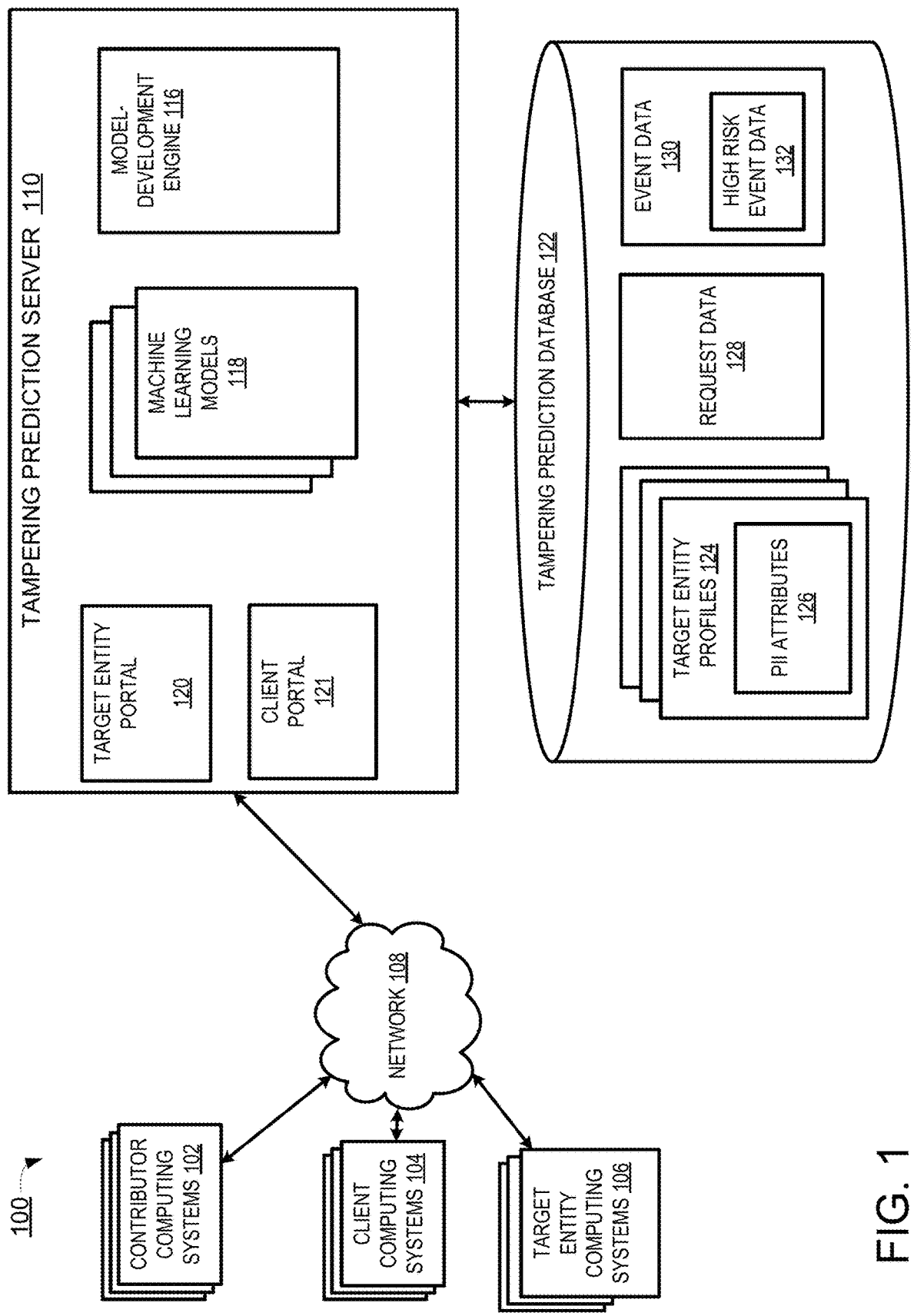
FIG. 1 is a block diagram depicting an example of a computing environment in which sets of machine learning modeling algorithms are trained and executed for predicting data tampering attempts and thereby modifying one or more client system operations, according to certain aspects of the present disclosure.

Certain aspects and features of the present disclosure involve training and applying a set of machine learning models to predict data tampering attempts by a target entity. A data tampering attempt may be a fraudulent attempt to cause the expungement, modification, or deletion of data used in security assessments of target entities.

For example, a target entity may request a modification to data associated with the target entity, where the data is used for a security assessment regarding the target entity. Multiple machine learning models are applied based on information in and surrounding the request along with historical data. At least one of the machine learning models includes a supervised learning-based model augmented with an unsupervised learning-based optimization model. Augmenting the supervised learning-based model in this way is advantageous for applications in which the model parameters are subject to frequent change. For example, entities that engage in data tampering or other efforts to circumvent security assessments frequently change their tactics. As a result, as techniques to circumvent security assessments change, the amount of training data that is accurately labeled for the purpose of performing these security assessments can be limited. By augmenting the supervised learning-based model with an unsupervised learning-based optimization model, an accurate prediction can be obtained, even with a relatively low amount of labeled data available. Multiple machine learning algorithms may be implemented at different stages to produce security assessment scores and signals representing different factors that indicate that the request to modify the electronic data associated with the target entity is likely a data tampering attempt. This security assessment information can be used to modify a machine-implemented operating environment to detect such potential tampering attempts.

In an illustrative example, a tampering prediction server receives a request from a target entity to modify stored event data. The stored event data could describe or otherwise correspond to a prior activity that is described in a stored profile for the target entity. The tampering prediction server may, based on the request, perform a security assessment for the target entity associated with the request in stages.

In a first stage, the tampering prediction server may analyze the data received in the request for suspicious attributes. At this first stage, the tampering prediction server applies a first set of machine learning models to the information about the target entity obtained from the request and additional information obtained from a tampering prediction database maintained by the tampering prediction server. The tampering prediction server may maintain data associated with prior data alteration requests and other interactions, such as mappings of email addresses, names, phone numbers, addresses, and so forth, to one another. The tampering prediction server may apply the set of machine learning models to the data from the request and the database to generate security assessments, which can be used to prevent data tampering or unauthorized system usage via the data tampering. For example, one machine learning model may generate security assessment signals related to the IP address associated with the request (e.g., to determine whether the origin of the request is suspicious in light of the user address noted in the form). Another machine learning model may generate security assessment signals related to a linkage of personally identifiable information ("PII") in the database and request (e.g., the email address submitted in the form is linked to a suspiciously high amount of different phone numbers in the database). Additional machine learning models may generate additional security assessment signals based on any supplemental documents included with the request. These security assessment signals are then used to generate a first security assessment score for the request.

A second stage of the tampering prediction analysis may involve identifying prior data modification requests associated with the same target entity. The tampering prediction server retrieves, from the tampering prediction database, event data associated with prior event data modification requests made by the target entity. The tampering prediction server applies a second machine learning model to the retrieved event data to compute a second security assessment score. The second machine learning model is a supervised learning based model augmented with an unsupervised learning-based model. At an initial setup phase, the second machine learning model has been trained using labeled training data related to entity data modification requests, and the optimization model has been trained using unlabeled training data related to entity data modification requests. The optimization model has then been used to augment the second machine learning model (e.g., using hyperparameter optimization). The tampering prediction server predicts a second security assessment score via an application of the augmented second model. This second security assessment score can be based on parameters evaluated by the trained machine learning model that indicate prior behavior of the target entity suggesting data tampering attempts. For example, the target entity may have submitted another entity data modification request recently, submitted a large number of entity data modification requests over an extended period of time, and so forth.

In some aspects, a third stage involves analyzing the outcome of such data modification requests. The tampering prediction server may extract information from the database indicating that data associated with the target entity was actually modified in response to an entity data modification request by the target entity. In a similar fashion to the second stage, another augmented machine learning model may be applied to identify a third security assessment score indicative of suspicious patterns in the number of data modifications associated with the target entity.

After producing the first, second, and potentially third security assessment scores, the tampering prediction server generates an overall security assessment score for the request based on the first, second, and/or third security assessment scores. For example, the tampering prediction server may use a decision tree-based machine learning model to produce the overall security assessment score, a rules-based computation, or other algorithm, to generate the overall security assessment score. The tampering prediction server may then provide the overall security assessment score to a client computer requesting security assessment information associated with the target entity. In the event that the security assessment score is above a certain threshold indicating fraud, the client computer may then prevent the target entity from using certain features of an interactive computing environment, accessing certain data sources via the interactive computing environment, etc.

Certain aspects can include operations and data structures with respect to neural networks or other models that improve how computing systems service analytical queries or otherwise update machine-implemented operating environments. For instance, a particular set of rules are employed in the training of the machine learning models that are implemented via program code. This particular set of rules allow, for example, one or more supervised learning-based models to be augmented with models trained on a fresher, larger, unlabeled dataset. Employment of these rules in the training of these computer-implemented models can allow for more effective prediction of the security assessment level associated with a request to modify data associated with the target entity, which can in turn facilitate the adaptation of an operating environment based on that tampering prediction (e.g., modifying an interactive computing environment based on security assessments derived from the information in a request to modify a record). Thus, certain aspects can effect improvements to machine-implemented operating environments that are adaptable based on target entity interactions with respect to those operating environments.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Example of a Computing Environment for Implementing Certain Aspects

Referring now to the drawings, FIG. 1 is a block diagram depicting an example of a computing system 100 in which a tampering prediction server 110 trains and executes machine learning models for predicting a data tampering attempt. FIG. 1 depicts examples of hardware components of a computing system 100, according to some aspects. The numbers of devices depicted in FIG. 1 are provided for illustrative purposes. Different numbers of devices may be used. For example, while various elements are depicted as single devices in FIG. 1, multiple devices may instead be used, such as one computing system that trains one or more machine learning models for predicting a data tampering attempt and a different computing system that executes the trained models.

The tampering prediction server 110 (also referred to herein as a "server computer") can communicate with various other computing systems, such as contributor computing systems 102 and client computing systems 104. For example, contributor computing systems 102 and client computing systems 104 may send data to the tampering prediction server 110 to be processed or may send signals to the tampering prediction server 110 that control or otherwise influence different aspects of the tampering prediction server 110 or the data it is processing. The client computing systems 104 may also interact with target entity computing systems 106 via one or more networks 108 to facilitate electronic transactions between target entities associated with the target entity computing systems 106 and online services provided by the client computing systems 104. For instance, an individual can use a target entity computing system 106, such as a laptop or other end-user device, to access an online service hosted by a client computing system 104. An electronic interaction between the target entity computing system 106 and the client computing system 104 can include, for example, the target entity computing system 106 being used to submit a request to submit a digital application (e.g., for access to a digital or physical resource, an application for membership to a service, etc.) to the client computing system 104 via the online service. The contributor computing systems 102, target entity computing systems 106, and client computing systems 104 may interact, via one or more networks 108, with the tampering prediction server 110.

Each contributor computing system 102 may include one or more third-party devices (e.g., computing devices or groups of computing devices), such as individual servers or groups of servers operating in a distributed manner. A contributor computing system 102 can include any computing device or group of computing devices operated by an online merchant, an e-commerce system, an employer, a payroll system, a human-resource management system, an insurance provider system, a healthcare provider system, a government data-provider system, etc. The contributor computing system 102 can include one or more server devices. The one or more server devices can include or can otherwise access one or more non-transitory computer-readable media. The contributor computing system 102 can also execute an online service. The online service can include executable instructions stored in one or more non-transitory computer-readable media. The contributor computing system 102 can further include one or more processing devices that are capable of storing, formatting, and transmitting income data, employment data, or both to tampering prediction server 110.

Each client computing system 104 may include one or more third-party devices, such as individual servers or groups of servers operating in a distributed manner. A client computing system 104 can include any computing device or group of computing devices operated by a provider of products or services such as a cloud services provider, seller, lender, or the like. The client computing system 104 can include one or more server devices. The one or more server devices can include or can otherwise access one or more non-transitory computer-readable media. The client computing system 104 can also execute an online service. The online service can include executable instructions stored in one or more non-transitory computer-readable media. The client computing system 104 can further include one or more processing devices that are capable of executing the online service to perform operations described herein.

In some aspects, the online service can provide an interactive computing environment, accessible to target entity computing systems 106, to facilitate electronic interactions involving a target entity associated with a target entity computing system 106. For example, electronic interactions between a target entity computing system 106 and a client computing system 104 may include a client computing system 104 granting the target entity computing system 106 access to a secure file system or location, entering into a commercial relationship with a target entity associated with the target entity computing system 106, providing a service to a target entity associated with the target entity computing system 106, and so forth.

Examples of the interactive computing environment include a mobile application specific to a particular client computing system 104, a web-based application accessible via mobile device, etc. In some aspects, the executable instructions for the interactive computing environment can include instructions that provide one or more graphical interfaces. The graphical interfaces are used by a target entity computing system 106 to access various functions of the interactive computing environment. For instance, the interactive computing environment may transmit data to, and receive data from, a target entity computing system 106 to shift between different states of interactive computing environment, where the different states allow one or more electronic interactions between the target entity computing system 106 and the client computing system 104 to be performed. The online service may transmit data to and receive data from the target entity computing system 106 to enable an interaction.

A target entity computing system 106 can include any computing device or other communication device operated by an entity that can request record alterations in association with the entity's own records. The entity may be an individual such as an employee, consumer, or traveler. The target entity computing system 106 can include one or more target entity computing systems 106. An target entity computing system 106 can include executable instructions stored in one or more non-transitory computer-readable media. The target entity computing system 106 can also include one or more processing devices that are capable of executing the target entity computing system 106 to perform operations described herein. In some aspects, the target entity computing system 106 can allow an entity to engage in electronic interactions with a client computing system 104.

For instance, the entity accessing the target entity computing system 106 can use the target entity computing system 106 to perform an interaction with a client computing system 104 via an interactive computing environment provided by an online service. An electronic interaction between the target entity computing system 106 and the client computing system 104 can include, for example, the target entity computing system 106 being used to query a set of sensitive or other controlled data, operating an electronic tool within an interactive computing environment hosted by the client computing system (e.g., a content-modification feature, an application-processing feature, etc.), access online financial services provided via the interactive computing environment, submit an online credit card application or other digital application to the client computing system 104 via the interactive computing environment, and so forth.

In some aspects, an interactive computing environment implemented through a client computing system 104 can be used to provide access to various online functions. As a simplified example, a website or other interactive computing environment provided by a financial institution can include electronic functions for obtaining one or more services. A target entity computing system 106 can be used to request access to the interactive computing environment provided by the client computing system 104. Based on the request, the client computing system 104 can collect data associated with the entity and communicate with the tampering prediction server 110 to identify whether it is likely that entity is fraudulently attempting to alter a record. Based on the tampering prediction results generated by the tampering prediction server 110, the client computing system 104 can determine whether to grant, delay, or deny the electronic interaction involving the target entity computing system 106, thereby granting or denying the target entity computing system 106 access to certain features of the interactive computing environment.

Each communication within the computing system 100 may occur over one or more data networks 108. A data network 108 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

A data network 108 may include network computers, sensors, databases, or other devices that may transmit or otherwise provide data to computing system 100. For example, a data network 108 may include local area network devices, such as routers, hubs, switches, or other computer networking devices. The data network 108 depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

The computing system 100 can include one or more tampering prediction servers 110. The tampering prediction server 110 may be a specialized computer or other machine that processes the data received within the computing system 100. The tampering prediction server 110 may include one or more other systems. For example, the tampering prediction server 110 may include a database system for accessing the network-attached storage unit, a communications grid, or both. A communications grid may be a grid-based computing system for processing large amounts of data.

The tampering prediction server 110 may include, or be communicatively coupled to, one or more network-attached storage units on which various repositories, databases, or other data structures are stored. Examples of these data structures are the tampering prediction database 122. Network-attached storage units may store a variety of different types of data organized in a variety of different ways and from a variety of different sources. For example, the network-attached storage unit may include storage other than the primary storage located within tampering prediction server 110 that is directly accessible by processors located therein. In some aspects, the network-attached storage unit may include secondary, tertiary, or auxiliary storage, such as large hard drives, servers, and virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory, or memory devices. In some aspects, the tampering prediction server 110 can also store any intermediate or final data generated by one or more components of the computing system 100.

The tampering prediction database 122 can store target entity profiles 124, which may include PII attributes 126. The PII attributes may include the target entity's name, mailing address, phone number, email address, and so forth. The target entity profiles 124 may further include additional information about a target entity, such information about prior interactions involving the target entity. Such interactions may include accessing an electronic resource, receiving a service, initiating or terminating a membership, opening a credit account, making a purchase, initiating or terminating employment, and so forth. In some aspects, the target entity profiles 124 may include information that can be obtained from employment records, travel records, criminal records, credit files or records, financial records, consumer records, or other data about the activities or characteristics of the target entity.

In some implementations, the target entity profiles 124 may be stored across multiple databases. For example, a first database may store information about email addresses to identify names and other information mapped to the email addresses. A second database may store information about phone numbers to identify names and other information mapped to the phone numbers.

The tampering prediction database 122 may store request data 128 about prior requests to modify records of historical events made by different entities. Such records may include information such as a timestamp indicating the time of the request, the name or other identifier of the requesting entity, as well as information about the type of request (e.g., a request to change the start date of an employment record, a request to dispute that the entity actually made a purchase, a request to dispute that the entity lived in a particular state, and so forth).

The tampering prediction database 122 may further store event data 130. The event data corresponds to historical events associated with a particular entity, such as opening a new account, moving to a new city, starting new employment, purchasing something, and so forth. The tampering prediction database 122 may store data for multiple different entities. In some cases, event data for a particular "event" may correspond to an event that actually occurred (e.g., Jane Doe moved to Montana on Jul. 4, 2020). Other event data may correspond to an incorrect or fraudulent record that does not actually correspond to something that a particular entity did. For example, an incorrect or fraudulent record could indicate that a person drove through a red light camera with a similar license plate, which was mistakenly attributed to a particular entity, or that someone stole the entity's credit card and made a major purchase, which was fraudulently attributed to the entity. In some aspects, multiple databases may be used to store different types of event data 130 (e.g., a database for travel events, a database for address change events, a database for loan events, a database for purchase events, etc.).

The event data 130 may include high risk event data 132. High risk event data 132 may correspond to event data 130, which was confirmed to be mistakenly or fraudulently attributed to a particular entity. High risk event data 132 may further include event data 130, which was identified by the tampering prediction server 110 to be likely to be fraudulent or otherwise inaccurate, using the methods described herein. A security assessment score may be assigned to identify a risk associated with an entity, and high risk event data 132 may have a security assessment score above some threshold value. Such high risk event data 132 may be tagged as high risk, tagged with a security assessment score, and/or stored to a separate data set than non-high risk event data.

In some implementations, data included in the target entity profiles 124 can be received from one or more contributor computing systems 102. In some aspects, multiple entries in the tampering prediction database 122 (e.g., target entity profiles 124, request data 128, and/or event data 130) can be linked to or otherwise associated with a given target entity profile 124 using a referential keying system.

The target entity profiles 124, request data 128, and/or event data 130 can be analyzed by the tampering prediction server 110 to identify, for example, whether a request to modify a historical event record is likely a fraudulent attempt to tamper with the record. The target entity profiles 124, request data 128, and/or event data 130 can be received by the tampering prediction server 110 from contributor computing systems 102, client computing systems 104, and/or target entity computing systems 106, generated by the tampering prediction server 110 based on communications with contributor computing systems 102, client computing systems 104, and/or target entity computing systems 106, or some combination thereof.

The tampering prediction server 110 can include one or more processing devices that execute program code, such as a model-development engine 116 and a plurality of machine learning models 118. The tampering prediction server may further include a target entity portal 120, which includes program code and a network interface to the target entity computing systems, and a client portal 121, which includes program code and a network interface to the client computing systems 104. The program code is stored on a non-transitory computer-readable medium.

The target entity portal 120 may include interface elements for receiving such a request from a target entity. For example, the target entity portal 120 may include program code for causing display of a set of form fields and elements for uploading documents. A target entity, via a target entity computing system 106, can use such interface elements to submit a request to the target entity portal 120 to modify a record. Although most of such requests may be legitimate, a target entity may be fraudulently submitting such a request in order to modify the electronic records to their advantage. For example, an individual may dispute that they were driving a car caught by a red light camera, or dispute that they ever opened up a particular bank account. Upon receipt of such requests, the request data may be passed to the machine learning models 118 for further processing.

The model-development engine 116 can generate or update the machine learning models 118. The machine learning models 118 can include program code that is executable by one or more processing devices. The program code can include a set of modeling algorithms. A particular modeling algorithm can include one or more functions for accessing or transforming input data from the tampering prediction database 122, such as a set of attribute values for a particular target entity, and one or more functions for computing the probability of a target event, such as whether a request by the target entity to modify a record is likely a fraudulent data tampering attempt. Functions for computing the probability of target event can include, for example, applying a trained machine learning model or other suitable model to the attribute values. The program code for computing the probability can include model structures (e.g., layers in a neural network), model parameter values (e.g., weights applied to nodes of a neural network), etc.

In some aspects, the tampering prediction server 110 can execute the machine learning models 118 that have been optimized, trained, or otherwise developed using the model-development engine 116. As described in further detail herein, upon receiving a target entity request to modify a record, the tampering prediction server 110 can apply multiple machine learning models to information in the target entity request, along with data in the tampering prediction database, to generate an overall security assessment score for the request.

The client portal 121 may include interface elements for providing the overall security assessment score, and potentially intermediate values and information used in generating the overall security assessment score, to one or more client computing systems 104. For example, the client portal 121 may push the overall security assessment score, intermediate security assessment scores used to arrive at the overall security assessment score, and more detailed indicators of risk used to arrive at the intermediate security assessment scores, to a client computing system 104 via an Application Program Interface (API). As another example, the client portal may cause display of information, including the overall security assessment score, on a client computing system 104 via the client portal 121.

In some aspects, the tampering prediction server 110 can use data obtained from contributor computing systems 102 to facilitate the real-time provision of information related to data tampering, such as indicators that a target entity is likely attempting to fraudulently cause a record to be altered, to client computing systems 104 that engage in electronic interactions with target entity computing systems 106. This provision of information facilitates real-time detection of potential fraudulent activity in electronic interactions. This real-time detection can occur during an electronic interaction between the client computing system 104 and a target entity computing system 106. The tampering prediction server 110 can communicate with the client computing systems 104 in a manner that is out of band with respect to the contributor computing systems 102, the target entity computing systems 106, or both. For example, the communications between the tampering prediction server 110 and a contributor computing system 102 can be performed via a separate communication channel, session, or both as compared to the communication channel or session established between the tampering prediction server 110 and a client computing system 104.

Techniques for Predicting Data Tampering Attempts

Figure 2:
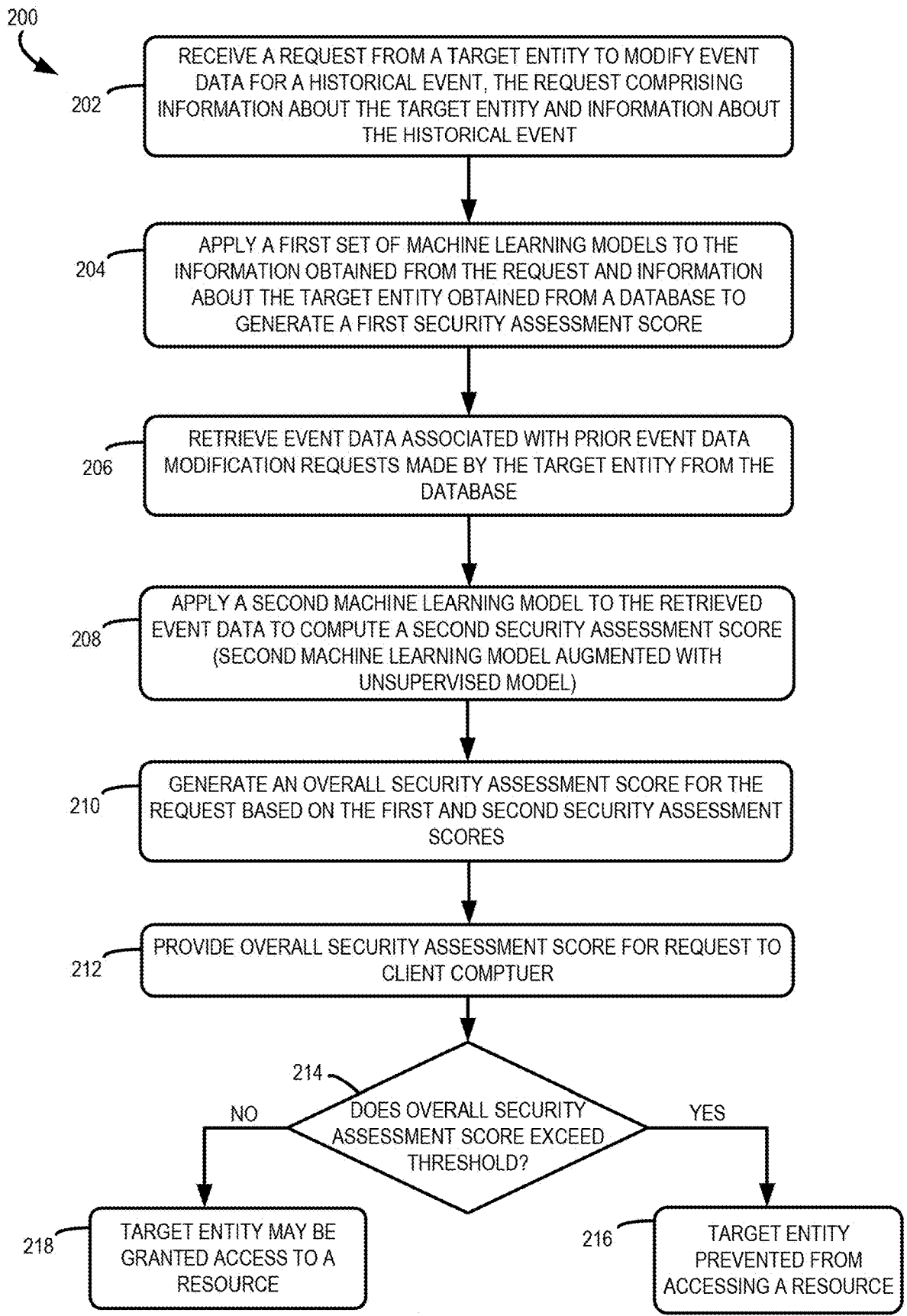
FIG. 2 depicts an example of a process for predicting data tampering attempts, according to certain aspects of the present disclosure.

FIG. 2 depicts an example of a process 200 for predicting a data tampering attempt. For illustrative purposes, the process 200 is described with reference to implementations described with respect to various examples depicted in FIG. 1. Other implementations, however, are possible. The operations in FIG. 2 are implemented in program code that is executed by one or more computing devices, such as the tampering prediction server 110 and/or a client computing system 104. In some aspects of the present disclosure, one or more operations shown in FIG. 2 may be omitted or performed in a different order. Similarly, additional operations not shown in FIG. 2 may be performed.

At block 202, the process 200 can involve receiving a request from a target entity to modify event data for a historical event. The request may include information about the target entity and information about the historical event. In some implementations, the request is received from a target entity computing system 106 via an online form (e.g., via the target entity portal 120). The request may be received by the tampering prediction server 110 from a target entity computing system 106 over network 108. In some aspects, the target entity fills out an online form to dispute a record. In some cases, the target entity may log in to an account and/or set up account on the target entity portal 120, providing information such as a user name, password, name, address, phone number, email address, and so forth. Alternatively, or additionally, the target entity may provide information by interacting with one or more form fields. Data from each form field may be transmitted to the tampering prediction server 110 over the network 108 (e.g., via a message with discrete fields for the data elements, via an Application Program Interface (API push), or the like). As a specific example, the target entity may enter, into respective fields, data elements including first name, last name, social security number, etc. The target entity may further enter information about the historical event. This may be information describing when, where, and how the disputed event occurred. The information about the historical event may include short answers in form fields (e.g., date, amount, etc.). Alternatively, or additionally, the target entity may provide and a narrative of unstructured text describing the reasons for requesting modification to the record of the historical event. Alternatively, or additionally, the request may include one or more text files such as a personal statement submitted by the target entity, including a narrative account of the historical event at issue.

In some aspects, the request may be based on or include one or more third-party reports. A third-party report may include the information about the target entity and/or information about the historical event. The third-party report may have been prepared for submission to a third-party (e.g., an organization separate from the organization managing the tampering prediction server). Examples of third-party reports include a Federal Trade Commission (FTC) report for submission to the FTC and a Digital Millennium Copyright Act (DMCA) takedown request for submission to a website. The target entity may have previously filed a report that includes relevant details about the historical event at issue for submission to a third-party. The target entity may upload the third-party report to the tampering prediction server via the target entity portal.

Alternatively, or additionally, the request may be received via one or more paper forms. For example, the target entity may mail in a completed form, potentially with supplemental documents. In this case, the data fields can be obtained by the tampering prediction server 110 by scanning the paper documents, performing Optical Character Recognition (OCR) processing on the paper documents, and extracting the data generated using the OCR processing.

In some aspects, the request may include supplemental documents that the target entity may attach with the request. Such supplemental documents may include an official report, such as a police report, which the target entity may provide as evidence when alleging that someone else has tampered with the target entity's records, made a false claim about the target entity, or otherwise mishandled information about the target entity. Supplemental documents included with the request may further include a notary letter (e.g., if the notary is attesting that the target entity gave a sworn statement to the notary in connection with the request to modify the records).

At block 204, the tampering prediction server 110 applies a first set of machine learning models to the information about the target entity obtained from the request, the information about the historical event obtained from the request, and information about the target entity obtained from the tampering prediction database 122 to generate a first security assessment score. The tampering prediction server 110 may apply multiple machine learning models to evaluate the risk level of multiple types of data received in the request. For example, at least one machine learning model may be used to build risk signals based on information extracted from the request, in comparison with records stored in the tampering prediction database 122, as further described below with respect to FIG. 5. Additional machine learning models may be applied to additional data points, such as location information (e.g., derived from an IP address or postal information), personal statements, and supplemental documents, as further described below with respect to FIG. 5. In some aspects, various different risk signals are generated and combined (e.g., with another machine learning model, rules, or other algorithms) to generate the first security assessment score, as further described below with respect to block 514 of FIG. 5.

At block 206, the tampering prediction server 110 retrieves event data associated with prior event data modification requests made by the target entity from the tampering prediction database 122. The tampering prediction server 110 may retrieve data from one or more prior disputes submitted by the target entity. This may involve querying the database to identify the disputes associated with the target entity, e.g., using a unique identifier of the target entity, such as an internal identifier or social security number.

At block 208, the tampering prediction server 110 applies a second machine learning model to the retrieved event data to compute a second security assessment score. The second machine learning model is trained to predict a risk level associated with prior record modification requests made by the target entity. The second machine learning model may predict a security assessment score based upon the retrieved event data, derivatives thereof, and potentially also information about the current request received at block 202.

To prepare data for processing by the second machine learning model, the tampering prediction server may prepare input attributes using the event data 130 associated with the target entity retrieved from the tampering prediction database at block 206. The tampering prediction server may process the event data to identify patterns in dispute inquiry transactions for suspicious disputes. Such patterns include spikes (e.g., many disputes in close proximity to one another), velocity (e.g., the rate of disputes and whether there is a sudden increase in disputes from the target entity), and volume of disputes (e.g., overall number of disputes). The tampering prediction server may calculate attributes, based on historical behaviors of the target entity, to use as input to the second machine learning model. These attributes may include:
  a) The timing between an event being recorded and the event being disputed (e.g., the target entity opens an account, then one month later submits a dispute alleging that the target entity did not actually open the account);
  b) How many disputes in a given time period made by the target entity (e.g., number of disputes in last 7 days, last 3 days, last 365 days, last 3 years, last 7 years, etc.);
  c) The type of disputes made by the target entity (e.g., amount of requests to modify records related to a medical record, the amount of requests to modify records related to auto loans, etc.);
  d) Repeat behaviors. For example, if the target entity demonstrates repeated patterns of conducting a high volume of disputes, followed by new events after the dispute. As a specific example, a target entity could request that a purchase is removed from her credit report, then buys a car on credit two months later.

The tampering prediction server 110 may then input the computed parameters and/or underlying data from the tampering prediction database 122 into the second machine learning model. The second machine learning model may be applied to the input data to detect abnormal patterns, and output a second security assessment score indicative of a risk level associated with the outcome of the prior requests made by the target entity.

In some implementations, the second machine learning model is a supervised model augmented with an unsupervised model. The second machine learning model may have been trained using labeled training data. The labeled training data may include event data from the tampering prediction database labeled to indicate whether the event data corresponds to a known or suspected fraudulent request to modify a record. The second machine learning model may be augmented with an optimization model that has been trained using unlabeled training data. The unlabeled training data may be a larger corpus of event data in the tampering prediction database which has not been labeled. Techniques for training such a model are described in further detail below with respect to FIG. 3.

At block 210, the tampering prediction server generates an overall security assessment score for the request based on the first security assessment score and the second security assessment score. In some aspects, the tampering prediction server applies a machine learning model to the first security assessment score and the second security assessment score to generate the overall security assessment score for the request. For example, a decision tree may receive as input the first security assessment score and the second security assessment score (and potentially a third security assessment score as described below with respect to FIG. 4). Such a machine learning model may have been trained using labeled first security assessment scores, labeled second security assessment scores, and potentially labeled third security assessment scores. The labeled security assessment scores may correspond to event records that were confirmed to be fraudulent or otherwise inaccurate and/or previously predicted to be fraudulent or otherwise inaccurate by the tampering prediction server 110.

Alternatively, or additionally, the overall security assessment score may be generated by an algorithm and/or rules. For example, the tampering prediction server may use a formula such as RO=3(R1)+7(R2) to weight the respective security assessment scores, where RO is the overall security assessment score, R1 is the first security assessment score, and R2 is the second security assessment score.

At block 212, the tampering prediction server provides the overall security assessment score for the request to the client computer. The tampering prediction server may, for example, transmit the overall security assessment score to the client computer via a message and/or API push or pull. Alternatively, or additionally, the tampering prediction server may display the overall security assessment score on an interface. In some implementations, the tampering prediction server may provide additional information to the client computer (e.g., the first security assessment score and the second security assessment score, and potentially additional security assessment scores and signals (e.g., third security assessment score, first risk signals, etc., as described with respect to FIGS. 4-5)).

At block 214, the client computer may determine whether or not the overall security assessment score exceeds a threshold. The client computer may maintain one or more stored threshold values to use in determining whether a request is deemed likely enough to be fraudulent to take some action to refuse the target entity access to a resource. The client computer may compare the security assessment score to such a threshold to determine whether the overall security assessment score exceeds the threshold. In an example, the received overall security assessment score is 90 and the threshold value is 75. In this example, the comparison indicates that the overall security assessment score is greater than the threshold (i.e., "yes" at block 214).

Alternatively, or additionally, in some implementations, the tampering prediction server 110 may make the determination at block 214. The tampering prediction server 110 may maintain one or more thresholds and compare the overall security assessment score to a threshold. In this case, the tampering prediction server 110 may transmit a flag or other indicator (e.g., 0 or 1; yes or no) to the client computer, and the client computer may then take an appropriate action based on the flag. In some implementations, such a flag may be transmitted with the overall security assessment score and/or underlying security assessment scores. Alternatively, the flag may be transmitted in lieu of the security assessment score(s).

At block 216, if the overall security assessment score exceeds the threshold value, then the client computer prevents the target entity from accessing a resource. For example, the resource is a secure database, and the target entity may attempt to tamper with records that are used to grant access to the secure database. Based on the overall security assessment indicating the record tampering attempt, the target entity is prevented from accessing the secure database (e.g., an attempt to retrieve data from the secure database is refused). As another example, the target entity may have attempted to alter her personnel records to obtain access to a secure facility. Based on the overall security assessment score exceeding the threshold value, the client computer may determine that the target entity should not gain access to the secure facility, and thereafter prevent the target entity from accessing the secure facility (e.g., when the target entity swipes a key card at the secure facility, access is denied and the door does not open). Other examples of a resource include a secured portion of a website, a particular tool in an online environment, goods, services, an account such as a credit account, and so forth.

At block 218, if the overall security assessment score does not exceed the threshold value, then the target entity may be granted access to a resource. If the risk evaluation indicates that the request is likely legitimate, then the client computer may permit the user access to a resource such as a secure location, good, service, or account.

Training a Machine Learning Model for Predicting Tampering Attempts

Figure 3:
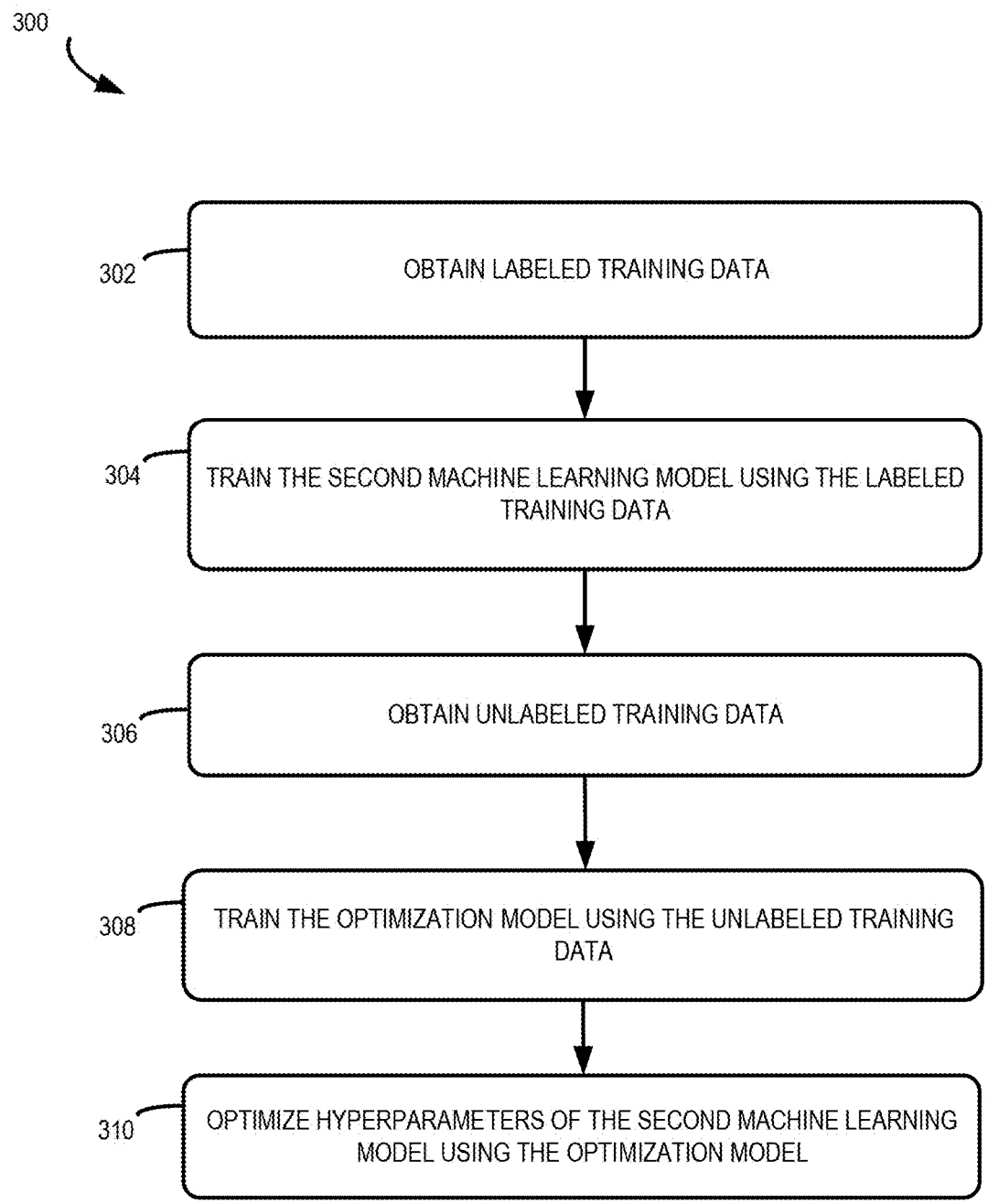
FIG. 3 depicts an example of a process for training a machine learning model as used in the processing of FIG. 2, according to certain aspects of the present disclosure.

FIG. 3 depicts an example of a process 300 for training a machine learning model for use in predicting a tampering attempt. For illustrative purposes, the process 300 is described with reference to implementations described with respect to various examples depicted in FIG. 1. Other implementations, however, are possible. The operations in FIG. 3 are implemented in program code that is executed by one or more computing devices, such as the tampering prediction server 110. In some aspects of the present disclosure, one or more operations shown in FIG. 3 may be omitted or performed in a different order. Similarly, additional operations not shown in FIG. 3 may be performed.

At block 302, the process 300 can involve obtaining labeled training data. The labeled training data may include known data tampering requests obtained by the tampering prediction server 110 from contributor computing systems 102 or client computing systems 104. For example, a service provider may have gone through a detailed dispute process and determined with some degree of certainty that a particular historical request to modify a record for a particular target entity was fraudulent. As a specific example, a target entity may have alleged that they did not purchase a refrigerator at a particular store on a particular day, but camera and signature data confirms that the target entity did in fact purchase the refrigerator. Accordingly, a request made by the target entity to remove the purchase of the refrigerators from their records may be labeled as fraudulent. Other disputes that were investigated and cleared may be labeled as legitimate or not suspected fraudulent. Alternatively, or additionally, the tampering prediction server may automatically label data based on the outcome of analysis of different record altering requests (e.g., if the processing of FIG. 2 indicates that a particular request was 90% likely to be a fraudulent attempt to tamper with the records, then the tampering prediction server may automatically label the record of the request as suspected fraudulent). This may be done in a binary fashion (e.g., 1=suspected fraudulent; 0=likely legitimate) or using the security assessment score to label the data.

At block 304, the tampering prediction server trains the second machine learning model using the labeled training data. The second machine learning model may be a model such as a neural network (e.g., a deep neural network). For example, the second machine learning model may be an extreme gradient boosting tree ("XGBoost," described in Chen et al., *XGBoost: A Scalable Tree Boosting System*, arXiv:1603.02754 (2016)). Use of an extreme gradient boosting tree as the second machine learning model has been found to provide very accurate risk predictions. The second machine learning model is trained using labeled training data (i.e., the second machine learning model is a supervised learning-based model). In some implementations, the second machine learning model may be trained using backpropagation. The second machine learning model may receive training data as input, and output a predicted result. This result is compared to the label assigned to that training data. The comparison may be performed by determining gradients based on the input and predicted result (e.g., by minimizing a loss function by computing and minimizing a loss value representing an error between the predicted result and the actual label value). The computed gradient is then used to update parameters of the neural network.

At block 306, the tampering prediction server obtains unlabeled training data. In addition to the labeled training data obtained at block 302, in some cases, a larger and/or more recent corpus of unlabeled training data is available. For example, new data corresponding to new target entity requests to modify records may be received by the tampering prediction server 110 periodically or in batches. Such request data may be used as unlabeled training data.

At block 308, the tampering prediction server trains the optimization model using the unlabeled training data. The optimization model is an unsupervised learning-based model, as it is trained using unlabeled training data. The optimization model may include one or more machine learning models, such as neural networks. The optimization model(s) may include, for example, an autoencoder (e.g., a deep autoencoder), a cluster analysis model (e.g., Principal Component Analysis (PCA), Hierarchical clustering analysis, or k-means clustering), and/or a generative adversarial network. For example, cluster analysis can be used to provide an initial predictors to an autoencoder.

The optimization model(s) may be trained using the unlabeled training data. For example, an autoencoder may be trained using backpropagation, as described in *Unsupervised Deep Learning (USDL) Tutorial—Autoencoders*, Stanford University, available at http://ufldl.stanford.edu/tutorial/unsupervised/Autoencoders/.

At block 310, the tampering prediction server may optimize hyperparameters of the second machine learning model using the optimization model. Using the optimization model, the tampering prediction server may identify a signal pattern (e.g., that one percent of the unlabeled training data are outliers). This information learned from the optimization model is used to augment the probability determinations made by the supervised learning model. The unsupervised learning model(s) may be used to identify outliers in the training data, which can be used to augment the supervised learning score.

In some aspects, the supervised learning-based model may be augmented using intuitive learning through a tree-based K-Nearest Neighbors (KNN) algorithm. The tampering prediction server adjusts the supervised learning prediction with the unsupervised learning result by evaluating the distance between the supervised learning prediction and the unsupervised learning outcome.

In some aspects, heuristic learning is used with a Monte Carlo tree search with Bayesian reinforcement. The Bayesian approach is used to find the best next node in the search. This best next node represents what the data tampering prediction should be.

In some aspects, the unsupervised model output is used to optimize hyperparameters of the supervised model using techniques such as Bayesian Hyperparameter Optimization. (See, e.g., Koehrsen, *A Conceptual Explanation of Bayesian Hyperparameter Optimization for Machine Learning*, Medium, available at https://towardsdatascience.com/a-conceptual-explanation-of-bayesian-model-based-hyperparameter-optimization-for-machine learning-b8172278050f (2018)).

In some aspects, the supervised learning-based model is weighted more heavily than the unsupervised learning-based model, to give the labeled training data more effect on the prediction outcome. Alternatively, or additionally, the models may be combined with one another using a technique such as ensemble learning (see, e.g., Zhou et al., *Ensembling Neural Networks: Many Could Be Better Than All*, Artificial Intelligence, vol. 137, pp. 239-263 (2002)).

In some aspects, the resulting combined model is updated in real time as additional unlabeled training data is acquired. This is particularly advantageous in situations in which it takes a longer time to obtain labeled training data (e.g., if a lengthy manual review process is required to identify fraud and label data associated with a confirmed fraudulent request). As the unlabeled training data continues to be made available to the tampering prediction server, the tampering prediction server can improve its accuracy leveraging the unlabeled training data. The labeled training data is also leveraged to improve the accuracy of the predictions.

Figure 4:
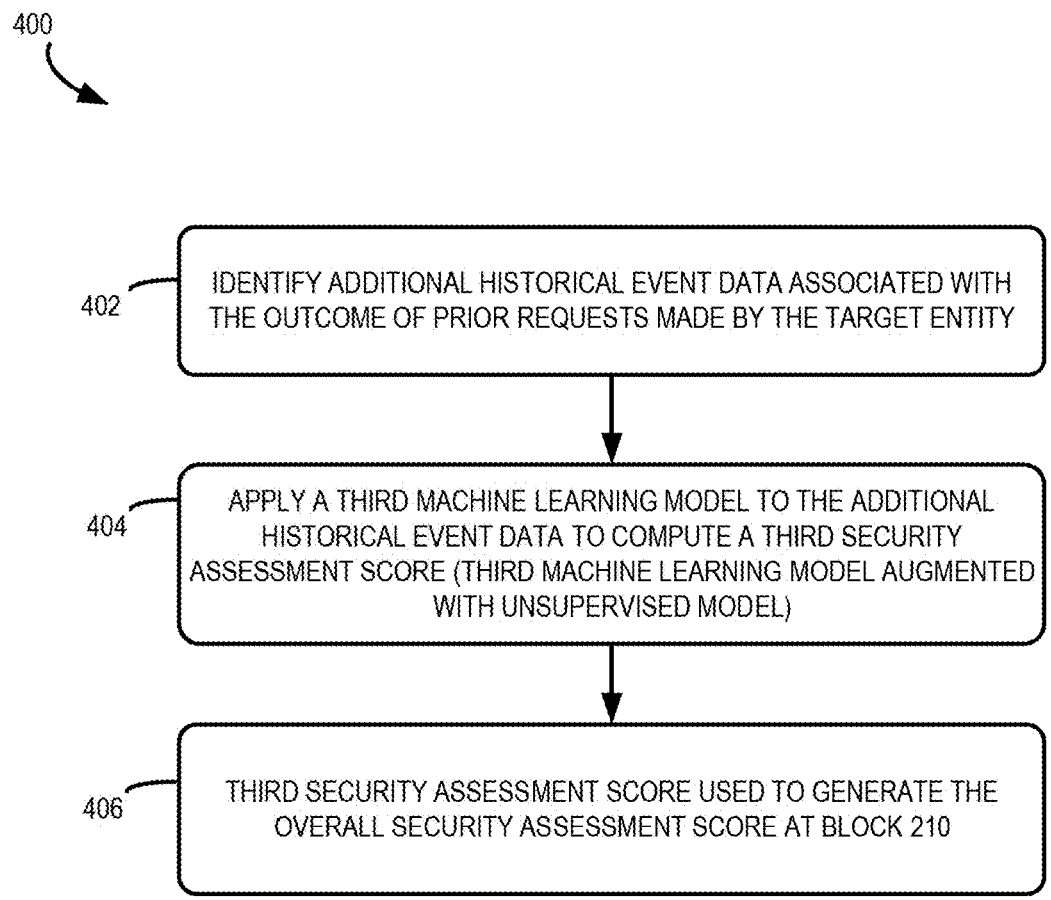
FIG. 4 illustrates additional operations that may be executed in predicting a data tampering attempt as described in FIG. 2, according to certain aspects of the present disclosure.

In some aspects, in addition to, or alternatively to, applying a machine learning model to data about prior requests to alter data records made by the target entity, the tampering prediction subsystem may apply a machine learning model to data about the result of prior requests to alter data records associated with the target entity. FIG. 4 depicts an example of a process 400 for computing a third security assessment score using such a process. For illustrative purposes, the process 400 is described with reference to implementations described with respect to various examples depicted in FIG. 1. Other implementations, however, are possible. The operations in FIG. 4 are implemented in program code that is executed by one or more computing devices, such as the tampering prediction server 110. In some aspects of the present disclosure, one or more operations shown in FIG. 4 may be omitted or performed in a different order. Similarly, additional operations not shown in FIG. 4 may be performed.

At block 402, the process 400 can involve identifying additional historical event data associated with the outcome of prior requests made by the target entity. The historical event data associated with the outcome of prior requests made by the target entity may include records of removed events. For example, if a target entity requested that a particular record be removed, and that record was removed, there may be a stored event noting the removal of the record (i.e., the record is a "suppressed record").

At block 404, the tampering prediction server applies a third machine learning model to the additional historical event data to compute a third security assessment score. The third machine learning model is trained to predict a risk level associated with the amount of suppressed records previously made by the target entity, and patterns in suppressed records associated with the target entity. The third machine learning model may compute a security assessment score based upon the retrieved event data, derivatives thereof, and potentially also information about the current request received at block 202.

To prepare data for processing by the third machine learning model, the tampering prediction server may prepare input attributes using the event data 130 associated with the target entity retrieved from the tampering prediction database at block 402. The tampering prediction server may process the event data to identify patterns in the historical suppressed record data of the target at a given time. This may include the relation between historical suppressed record data with other event data (e.g., if the target entity has repeatedly attempted to access resources soon after having a record removed). The tampering prediction server may compute attributes such as:

(a) A rate of suppressed records (e.g., a time elapsed from a record being recorded to the record being suppressed);

(b) Amount of records suppressed in a given time period (e.g., a number of records suppressed in last 7 days, last 30 days, last 365 days, last 3 years, last 7 years, etc.);

(c) The variety of records suppressed (e.g., a number of employment records vs. criminal records, and/or counting records based on industry type, such as credit cards, auto loans, mortgages, educational loans, personal loans, medical bill based loans, etc.); and (d) Repeat behavior (e.g., repeated patterns from this historical data about record suppressions, type of record suppressions, and suspicious activity in association with a record suppression, such as attempting to access a large number of resources soon after the record is suppressed).

The third machine learning model can then be applied to the processed data to detect abnormal patterns. The tampering prediction server 110 may input the computed parameters and/or underlying data into the third machine learning model. In some aspects, the third machine learning model may be augmented with an unsupervised model in a similar fashion as described above with respect to the second machine learning model. The third machine learning may be applied to the additional historical event data by providing the additional historical event data as input to the third machine learning model. For example, the target entity may have had records successfully removed on five separate occasions over the course of ten years. Information characterizing the date of each record removal, and the type of record removed, are input to the fourth machine learning model. The third machine learning model outputs a security assessment score indicating how likely it is that the current request to alter the record is fraudulent.

At block 406, the tampering prediction server uses the third security assessment score to generate the overall security assessment score at block 210. As described above at block 210, a machine learning model, such as a decision tree, a rule-based algorithm, or the like, may be used to generate an overall security assessment score based on a set of security assessment scores. In some aspects, the third security assessment score is part of this set of security assessment scores used to generate the overall security assessment score. Accordingly, in some implementations, the overall security assessment score is also based on the outcome of historical requests made by the target entity, as well as the timing of such outcomes.

Figure 5:
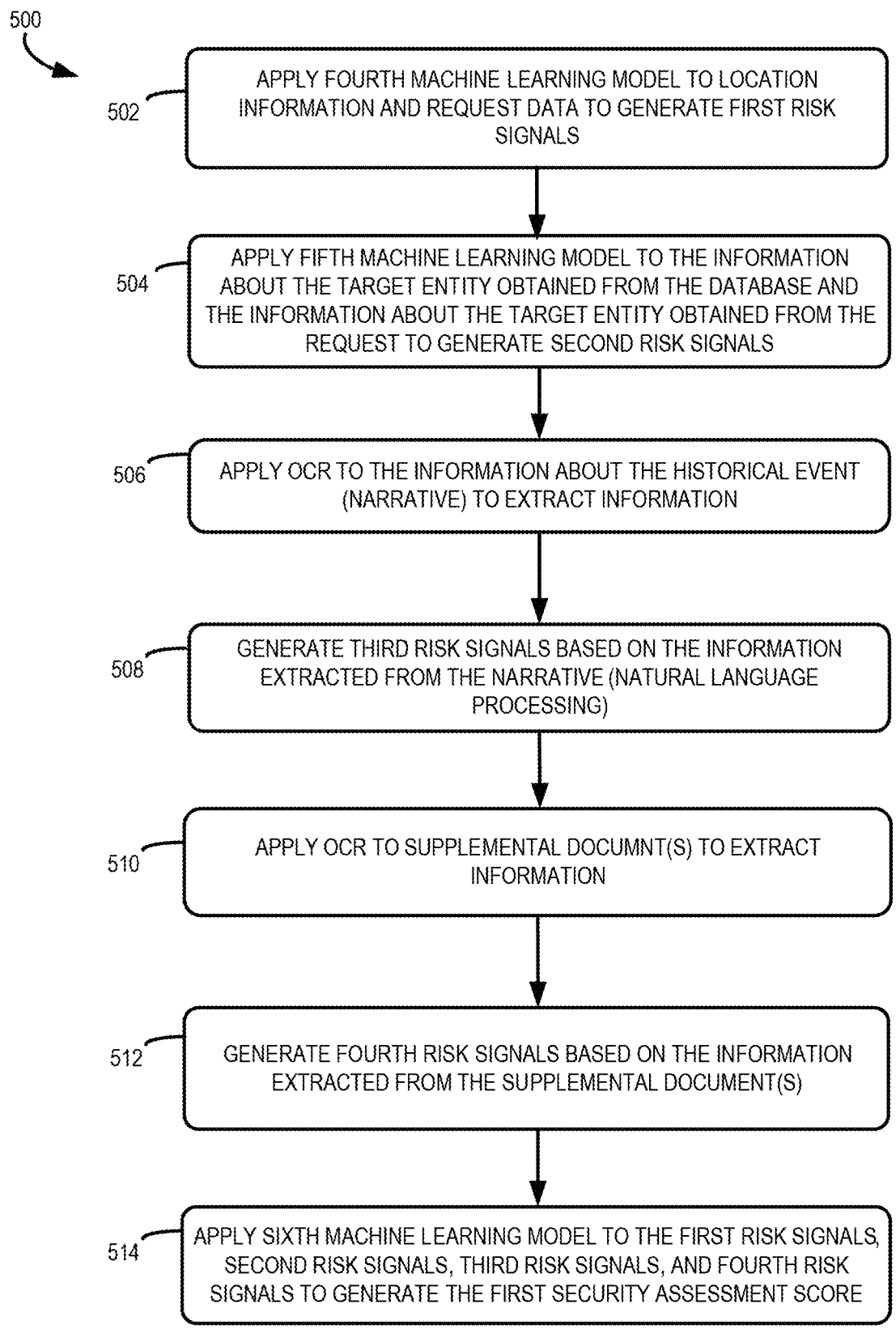
FIG. 5 depicts illustrates additional operations that may be executed in predicting a data tampering attempt as described in FIG. 2, according to certain aspects of the present disclosure.

FIG. 5 depicts an example of a process 500 for generating risk signals used in generating the first security assessment score at block 204 of FIG. 2. The risk signals may include patterns in data that indicate that fraud is likely. For illustrative purposes, the process 500 is described with reference to implementations described with respect to various examples depicted in FIG. 1. Other implementations, however, are possible. The operations in FIG. 5 are implemented in program code that is executed by one or more computing devices, such as the tampering prediction server 110. In some aspects of the present disclosure, one or more operations shown in FIG. 5 may be omitted or performed in a different order. Similarly, additional operations not shown in FIG. 5 may be performed.

At block 502, the process 500 can involve applying a fourth machine learning model to location information and the request data to generate first risk signals. In some implementations, the request received at block 202 may further include location information. For example, the target entity computing system 106 may provide to the tampering prediction server 110 location information via one or more of an Internet Protocol (IP) address or Global Positioning System (GPS) information. Alternatively, or additionally, location information can be extracted from a mailed-in request by analyzing the postage stamps and/or postmarks on the envelope.

At least one machine learning model may be applied to the information submitted in the request form, along with the location data to identify any indication that the information submitted in the request form is fraudulent. For example, for an IP address, certain IP addresses may be deemed risky intrinsically, such as an IP origin behind an anonymous proxy or an IP address that has been blacklisted. IP risk signals may include:

IP behind an anonymous proxy

IP has been blacklisted

IP from high fraud risk country

IP from a The Onion Router (TOR) network exit node.

Alternatively, or additionally, the location information obtained from an IP address, postmark, or the like can be compared to an address provided by the target entity (e.g., in a form or report). For example, if the location information indicates a geographic location that is greater than a certain threshold (e.g., 200 miles) away from a home address provided by the target entity, or if the geographic location does not follow the same pattern to the target entity's historical geographic locations, then the model may assign a higher security assessment score than if the location information is consistent with the address provided by the target entity.

In some implementations, multiple machine learning models may be used to evaluate the location data. One machine learning model may evaluate the IP address in and of itself to identify suspicious features. For example, sequential based clustering may be used to combine IP intelligence attributes that have been learned from historical data (e.g., a list of blacklisted IP addresses, IP addresses linked to prior suspicious activity, etc.). Another machine learning model may be used to evaluate the IP address in comparison with historical patterns associated with the target entity's historic geographic locations. A clustering model, such as a sequence clustering model may, for example, be used to generate risk signals related to whether the IP address is consistent with a pattern of activity corresponding to the target entity or entities similar to the target entity. This may be determined based on historic interactions stored to the tampering prediction database 122. In some implementations, yet another machine learning model is applied to the location information. For example, a graph analytics based model may be used to analyze PII attributes 126 of the target entity, as well as the IP address or physical address received in connection with the target entity request. These factors may be used to build a graph network, which is then used to identify whether any abnormal or excessive linkage or association exists.

In some aspects, multiple such machine learning models are applied to the location information and other information about the target entity in parallel. Each model may substantially concurrently receive input location information, PII information from the database, and a timestamp, and predict risk signals. These risk signals may be combined to arrive at the first risk signals generated based on the location information.

At block 504, the tampering prediction server applies a fifth machine learning model to the information about the target entity obtained from the database and the information about the target entity obtained from the request to generate second risk signals. The second risk signals may represent inconsistencies in PII data stored by the tampering prediction server and information received in the request. For example, a risk signal may correspond to the address provided in an official report being different from the target entity's address, as extracted from the tampering prediction database 122. As another example, the PII data received in the request may be compared to the PII data stored in the database to identify risk signals, such as the email address or phone number being associated with an excessive number of different target entities, the phone number being associated with an excessive number of email addresses in the database, address change recency, velocity of non-dispute inquiries, and so forth.

Some PII risk signals may be determined based on the information obtained from the request without considering stored data. For example, a risk signal may correspond to an email address received with the request being different from the first and last name received in the request (e.g., if the email address JoeJones@mail.com, while the submitted name is Melody Wu, this may indicate that fraud is more likely). As another example, if an email and/or phone number are not provided, this can indicate risk. Additional risk signals include an invalid or inactive phone number, an invalid email address, an email address including suspicious symbols (e.g., it is suspect when each letter in an email address is separated by a period), and a voice-over-internet (VOI) phone number.

In some aspects, PII information received in connection with the request is compared with the information retrieved from the database using a machine learning model to predict one or more risk indicators. For example, a graph-based model may be used to build a graph to detect any excessive anomalies in the PII information received with the request, alone or in combination with the PII information identified in the database.

Alternatively, or additionally, a rule-based approach may be implemented (e.g., if a the email address matches more than two different names in the database, then a risk signal is flagged; if the email address is invalid then a risk signal is flagged, and so forth).

At block 506, the tampering prediction server applies OCR to the information about the historical event (including narrative description) to extract information. In some aspects, as described above with respect to block 202 of FIG. 2, the target entity submits a scanned third-party report, which may include a narrative description describing the historical record that the target entity is requesting to modify. Alternatively, or additionally, the target entity may submit a written request to modify a record (e.g., via the mail), which may include a narrative statement describing the record that the target entity is requesting to modify. Such a written request may be scanned and uploaded to the tampering prediction server. In either case, the tampering prediction server may apply OCR to identify text data from the scanned image. The tampering prediction server extracts content from the narrative description for further processing.

At block 508, the tampering prediction server generates third risk signals based on the information extracted from the narrative description using natural language processing. In some cases, the third risk signals may be generated based on information obtained via OCR at block 506. Alternatively, or additionally, the third risk signals may be generated based on information submitted electronically to the portal (e.g., by a user entering information into form fields and/or submitting a personal statement as a text file attachment).

In some aspects, the tampering prediction server applies natural language processing techniques to analyze the extracted information. This may involve the use of one or more machine learning models. Fraudulent requests can be identified by evaluating the paragraph and document similarity from the reports and personal statement submitted by fraudsters to generate a similarity score. The higher the similarity score, the higher the risk level. Often, a fraudulent statement will be generated using a template with specific language that is not likely to occur in a genuine personal statement or other narrative description. When fraudsters submit fake claims, they tend to use the same template. Accordingly, identifying common sentences and key words between the request and previously submitted requests can be used to generate risk signals. Alternatively, or additionally, sentiment analysis can provide key risk signals, since target entities that legitimately are dealing with an inaccurate personal record tend to use more emotional language, in comparison with fraudsters that tend to use dry language. Alternatively, or additionally, the tampering prediction server may analyze fonts or handwriting to identify patterns. For example, if multiple prior submissions include an unusual font style or size, as does the current request, this may be indicative of a fraudulent request. As another example, if the current request is in the same handwriting as multiple prior submissions, this may be indicative of a fraudulent request.

In some aspects, the tampering prediction server uses a two-step approach to learn unstructured text data similarity: (1) identify groups with abnormally high or low frequency occurrence and (2) use word2vector to create embeddings, then evaluate the similarity by transforming them into a matrix representation. The tampering prediction server may then combine the predictions from both paths (1) and (2), to generate the third risk signals by predicting the probability of similarity between the current text data and prior submitted request data. If the text is similar to one or more prior submitted requests, then the third risk signals may indicate that the present request is relatively high risk.

At block 510, the tampering prediction server applies OCR to one or more supplemental documents to extract information from the supplemental document(s). The supplemental documents may include documents such as police reports, notary letters, and the like, which the target entity may upload with the request to support the request.

In some aspects, the supplemental document(s) include a police report, in which case relevant information to extract include the address and phone number of the police station, and a police report number. Alternatively or additionally, the tampering prediction server may extract information from a notary letter such as the name of the notary, the notary stamp, and the notary's signature.

At block 512, the tampering prediction server generates fourth risk signals based on the information extracted from the supplemental document(s). The fourth risk signals may be generated by applying one or more machine learning models to the information extracted from the official report. For example, the tampering prediction server may identify a case report number from the official report, and look this up to confirm whether it is a valid report number. The official report may include the address of a police station. The tampering prediction server may compare the address of the police station with the address of the target entity provided with the request, to identify whether the addresses are consistent (e.g., the security assessment score may increase if the police station is in a different state than the target entity). The tampering prediction server may evaluate the phone number on the official report (e.g., an "800" number may not be consistent with the proper phone number for a police station).

In the case of a notary report, the machine learning model may identify anomalies between information extracted from the notary stamp and other information in the notary letter and/or other information provided by the user. For example, notary stamps tend to include the name of the notary, and notary stamps tend to differ based on geographic location. The model may detect anomalies between the name of the notary on the signature line of the notary report and the name of the notary on the notary stamp, as this may be indicative of a fraudulent notary letter. For example, an OCR algorithm such as Pytesseract may be modified to fit a round-shaped stamp image. Image and signature outliers may be identified using a set of deep learning models (e.g., ResNet) to identify pictures and signatures that are not associated with an actual notary. The model may further detect anomalies between the geographic location indicated by the notary stamp and the address of the target entity (e.g., it may be suspect if the notary and target entity are in different states).

At block 514, the tampering prediction server applies a sixth machine learning model to the first risk signals, second risk signals, third risk signals, and fourth risk signals to generate the first security assessment score. The sixth machine learning model may have been trained using labeled risk signal data (e.g., the first risk signals, second risk signals third risk signals, and fourth risk signals). The risk signal data may, for example, be labeled after a fraud analysis has been conducted to confirm that the risk signals are associated with a fraudulent request to modify a record, and potentially to what extent (e.g., to label the risk signal data in proportion to the amount of fraudulent record modification requests associated with a given risk signal).

In some aspects, the sixth machine learning model is supervised learning-based model augmented with an unsupervised learning-based model. The sixth machine learning model may be augmented with an optimization model that has been trained using unlabeled risk signal data (e.g., the first risk signals, second risk signals, third risk signals and fourth risk signals). The sixth machine learning model may be trained and augmented in a similar fashion as training and augmenting the second machine learning model, described above with respect to FIG. 3.

In one example, the sixth machine learning model may be based on a gradient boosted decision tree model for the supervised learning model and deep autoencoder-based outlier detection for the unsupervised model. In some aspects, the unsupervised model used to augment the sixth machine learning model may be weighted more heavily with respect to the unsupervised model, as compared with the process described with respect to FIG. 3. This may be suitable when the labeling techniques used in the process of FIG. 3 may generate a larger amount of labeled data than available for the supervised model used at block 514 (e.g., since the input of the sixth machine learning model is the output of multiple security assessment scores and signals which may require more effort in obtaining the labeled training data).

In some aspects, after generating the risk signals (e.g., first risk signals, second risk signals, third risk signals, and fourth risk signals), the tampering prediction server stores the risk signals in the tampering prediction database. Such information may be stored as high risk event data 132, if the data is considered high risk. The first security assessment score (and other security assessment scores as described herein) may further be stored to the tampering prediction database 122. This information can be used when evaluating new risks for potential tampering prediction. For example, if high risk events or multiple prior requests are associated with a particular target entity, these factors may cause the security assessment score to increase in future assessments.

Example Aspect—"Washing" Records

One example application of the techniques described herein is "credit washing." In credit washing, a fraudster attempts to have information removed from a credit report by alleging that they did not make a purchase or open an account (e.g., by alleging that a tradeline on the report is itself fraudulent). For example, fraudsters pretend to be an identity fraud victim by using fake FTC reports, fake police reports, and providing fake information for tradeline disputes. A target entity may use their real identity and commit credit abuse (first-party fraud) by disputing excessively and may provide a combination of real/fake information to clean up their bad debt. The consequence of credit washing fraud is that the accuracy of the consumer credit file is diluted and credit scores may be artificially inflated since the bad debts are removed with successful disputes. Companies would grant credit and/or services based on the diluted report to fraudsters, and end up taking fraud loss to their business. Credit washing opens the doors to fraudsters continuing to have access to credit or services based on falsified reports, committing more fraud, and the vicious cycle would continue. The techniques described herein can identify and alert suspected credit washing behavior proactively and accurately with unique data and approaches.

For example, the data in the tampering prediction database may include credit-related data, such as credit instruments applied for and obtained, purchases made, and fraudulent transactions suspected or confirmed. The tampering prediction server may analyze target entity behavior in association with requests to modify records that are claims made by a given target entity that a record in her credit report is fraudulent (e.g., by alleging that she did not actually make one or more purchases or open one or more accounts). The tampering prediction server can then predict whether such a claim is likely to be credit washing.

The techniques described herein are particularly useful for the credit washing application and other fraud-related applications. For example, augmenting a supervised learning-based model with one or more unsupervised learning-based model(s) can keep the model fresh in the fraud setting, as fraud is ever-changing, and once a model trained on labeled data is put into production, the fraud markers may change as the fraudsters change their tactics. Using the techniques described herein, the model can be updated in real-time as the data changes, providing more accurate results.

Examples of Operations Performed by Client Systems Using Security Assessment Scores A client computing system 104 can analyze information received from the tampering prediction server 110 to perform one or more operations. In an illustrative example of a process executed by a client computing system 104, the client computing system 104 can receive or otherwise access a security assessment score, flag, and/or underlying data from the tampering prediction server 110 (e.g., as described above at block 212). For instance, a client computing system 104 can be communicatively coupled to one or more non-transitory computer-readable media, either locally or via a data network. The client computing system 104 can request, retrieve, or otherwise access prediction data that includes data values of one or more security assessment scores with respect to a target entity.

Alternatively, or additionally, in some implementations the tampering prediction server 110 may maintain one or more thresholds and compare the overall security assessment score to a threshold. In this case, the tampering prediction server 110 may transmit a flag or other indicator (e.g., 0 or 1; yes or no) to the client computer, and the client computer may then take an appropriate action based on the flag. In some implementations, such a flag may be transmitted with the overall security assessment score and/or underlying security assessment scores. Alternatively, the flag may be transmitted in lieu of the security assessment score(s).

The client computing system 104 can modify a client computing system 104 operation based on the generated security assessment score(s). For instance, the overall security assessment score provided at block 212 can be used to modify the operation of different types of machine-implemented systems within a given operating environment.

In some aspects, the security assessment score(s) indicate a risk level associated with a target entity that is described by or otherwise associated with the security assessment scores. Modifying the client computing system operation based on the computed security assessment score(s) can include causing the client computing system 104 or another computing system to control access to one or more interactive computing environments by a target entity associated with the security assessment score(s).

For example, the client computing system 104, or another computing system that is communicatively coupled to the client computing system 104, can include one or more processing devices that execute instructions providing an interactive computing environment accessible to target entity computing systems 106. Examples of the interactive computing environment include a mobile application specific to a particular client computing system 104, a web-based application accessible via mobile device, etc. In some aspects, the executable instructions for the interactive computing environment can include instructions that provide one or more graphical interfaces. The graphical interfaces are used by a target entity computing system 106 to access various functions of the interactive computing environment. For instance, the interactive computing environment may transmit data to and receive data from a target entity computing system 106 to shift between different states of interactive computing environment, where the different states allow one or more electronic transactions between the target entity computing system 106 and the client computing system 104 (or other computing system) to be performed. If a risk level is sufficiently low (e.g., the security assessment score does not exceed the threshold at block 214), the client computing system 104 (or other computing system) can provide a target entity computing system 106 associated with the target entity with access to a permitted function of the interactive computing environment. If a risk level is too high (e.g., the security assessment score exceeds the threshold at block 214), the client computing system 104 (or other computing system) can prevent a target entity computing system 106 associated with the target entity from accessing a restricted function of the interactive computing environment.

The following discussion involves, for illustrative purposes, a simplified example of an interactive computing environment implemented through a client computing system 104 to provide access to various online functions. In this example, a target entity computing system 106 can engage in an electronic interaction with a client computing system 104 via an interactive computing environment. An electronic interaction between the target entity computing system 106 and the client computing system 104 can include, for example, the target entity computing system 106 being used to query a set of sensitive or other controlled data, access online financial services provided via the interactive computing environment, submit an online credit card application or other digital application to the client computing system 104 via the interactive computing environment, operate an electronic tool within an interactive computing environment provided by a client computing system 104 (e.g., a content-modification feature, an application-processing feature, etc.), or perform some other electronic operation within a computing environment.

For instance, a website or other interactive computing environment provided by a financial institution's client computing system 104 can include electronic functions for obtaining one or more financial services, such as loan application and management tools, credit card application and transaction management workflows, electronic fund transfers, etc. A target entity computing system 106 can be used to request access to the interactive computing environment provided by the client computing system 104, which can selectively grant or deny access to various electronic functions.

Based on the request, the client computing system 104 can collect data associated with the customer and/or use the risk indicator obtained from the tampering prediction server 110 to instruct another device, such as a web server within the same computing environment as the client computing system 104 or an independent, third-party computing system in communication with the client computing system 104. The instructions can indicate whether to grant the access request of the target entity computing system 106 to certain features of the interactive computing environment.

For instance, if the security assessment score indicates that a target entity is associated with a sufficient likelihood of a particular risk, a target entity computing system 106 used by the target entity can be prevented from accessing certain features of an interactive computing environment. The system controlling the interactive computing environment (e.g., a client computing system 104, a web server, or some combination thereof) can prevent, based on the threshold level of risk, the target entity computing system 106 from advancing a transaction within the interactive computing environment. Preventing the target entity computing system 106 from advancing the transaction can include, for example, sending a control signal to a web server hosting an online platform, where the control signal instructs the web server to deny access to one or more functions of the interactive computing environment (e.g., functions available to authorized users of the platform).

Additionally or alternatively, modifying the client computing system 104 operation based on the security assessment score(s) computed by the tampering prediction server can include causing a system that controls an interactive computing environment (e.g., a client computing system 104, a web server, or some combination thereof) to modify the functionality of an online interface provided to a target entity computing system 106 associated with the target entity. For instance, the client computing system 104 can use the security assessment score(s) generated by the tampering prediction server 110 to implement a modification to an interface of an interactive computing environment presented at a target entity computing system 106. In this example, the target entity computing system 106 is associated with a particular target entity whose request data 128 and/or PII attributes 126 are used to compute the security assessment score(s). If the security assessment score(s) indicate that a target event for a target entity will occur in a given time period, the client computing system 104 (or a third-party system with which the client computing system 104 communicates) could rearrange the layout of an online interface so that features or content associated with a particular risk level are presented more prominently (e.g., by presenting online products or services targeted to the risk level), features or content associated with different risk levels are hidden, presented less prominently, or some combination thereof.

In various aspects, the client computing system 104 or a third-party system performs these modifications automatically based on an analysis of the security assessment score(s) (alone or in combination with other data about the target entity), manually based on inputs that occur subsequent to receiving the security assessment score(s) from the tampering prediction server 110, or some combination thereof. In some aspects, modifying one or more interface elements is performed in real time (i.e., during a session in which a target entity computing system 106 accesses or attempts to access an interactive computing environment). For instance, an online platform may include different modes, in which a first type of interactive user experience (e.g., placement of menu functions, hiding or displaying content, etc.) is presented to a first type of target entity group associated with a first risk level and a second type of interactive user experience is presented to a second type of target entity group associated with a different risk level. If, during a session, security assessment score(s) are computed that indicate a target entity of the target entity computing system 106 belongs to the second group, the online platform could switch to the second mode.

In some aspects, modifying the online interface or other features of an interactive computing environment can be used to control communications between a target entity computing system 106 and a system hosting an online environment (e.g., a client computing system 104 that obtains security assessment score(s) from the tampering prediction server 110, a third-party computing system in communication with the client computing system 104, etc.). For instance, security assessment score(s) generated by the tampering prediction server 110 could indicate that a target entity computing system 106 or an associated target entity is associated with a certain risk level. The system hosting an online environment can require, based on the determined risk level, that certain types of interactions with an online interface be performed by the target entity computing system 106 as a condition for the target entity computing system 106 to be provided with access to certain features of an interactive computing environment. In one example, the online interface can be modified to prompt for certain types of authentication data (e.g., a password, a biometric, etc.) to be inputted at the target entity computing system 106 before allowing the target entity computing system 106 to access certain tools within the interactive computing environment. In another example, the online interface can be modified to prompt for certain types of transaction data (e.g., payment information and a specific payment amount authorized by a target entity, acceptance of certain conditions displayed via the interface) to be inputted at the target entity computing system 106 before allowing the target entity computing system 106 to access certain portions of the interactive computing environment, such as tools available to paying customers. In another example, the online interface can be modified to prompt for certain types of authentication data (e.g., a password, a biometric, etc.) to be inputted at the target entity computing system 106 before allowing the target entity computing system 106 to access certain secured datasets via the interactive computing environment.

In additional or alternative aspects, a client computing system 104 can use security assessment score(s) obtained from the tampering prediction server 110 to generate one or more reports regarding a target entity or a group of target entities. In a simplified example, knowing when a target entity, such as a borrower, has likely fraudulently caused their credit data to be modified, could allow a target entity associated with the client computing system 104 (e.g., a lender) to more accurately price certain online products, to predict tampering attempts by a given target entity and thereby manage target entity portfolios, optimize and value portfolios of loans by providing security assessment score information, etc.

Example of Using a Neural Network for Tampering-Prediction Model

In some aspects, one or more of the machine learning models as described herein can be a neural network model. A neural network can be represented as one or more hidden layers of interconnected nodes that can exchange data between one another. The layers may be considered hidden because they may not be directly observable in the normal functioning of the neural network.

A neural network can be trained in any suitable manner. For instance, the connections between the nodes can have numeric weights that can be tuned based on experience. Such tuning can make neural networks adaptive and capable of "learning." Tuning the numeric weights can involve adjusting or modifying the numeric weights to increase the accuracy of a risk indicator, prediction of target entity behavior, or other response variable provided by the neural network. Additionally, or alternatively, a neural network model can be trained by iteratively adjusting predictor variables (e.g., the training data or derivatives thereof) represented by the neural network, the number of nodes in the neural network, or the number of hidden layers in the neural network. Adjusting the predictor variables can include eliminating the predictor variable from the neural network. Adjusting the number of nodes in the neural network can include adding or removing a node from a hidden layer in the neural network. Adjusting the number of hidden layers in the neural network can include adding or removing a hidden layer in the neural network.

In some aspects, training a neural network model for each time bin includes iteratively adjusting the structure of the neural network (e.g., the number of nodes in the neural network, number of layers in the neural network, connections between layers, etc.), such that a monotonic relationship exists between each of the predictor variables and the risk indicator, prediction of target entity behavior, or other response variable. Examples of a monotonic relationship between a predictor variable and a response variable include a relationship in which a value of the response variable increases as the value of the predictor variable increases or a relationship in which the value of the response variable decreases as the value of the predictor variable increases. The neural network can be optimized such that a monotonic relationship exists between each predictor variable and the response variable. The monotonicity of these relationships can be determined based on a rate of change of the value of the response variable with respect to each predictor variable.

In some aspects, the monotonicity constraint is enforced using an exploratory data analysis of the training data. For example, if the exploratory data analysis indicates that the relationship between one of the predictor variables and an odds ratio (e.g., an odds index) is positive, and the neural network shows a negative relationship between a predictor variable and a credit score, the neural network can be modified. For example, the predictor variable can be eliminated from the neural network or the architecture of the neural network can be changed (e.g., by adding or removing a node from a hidden layer or increasing or decreasing the number of hidden layers).

Example of Using a Logistic Regression for Tampering-Prediction Model

In additional or alternative aspects, a tampering-prediction model as used herein can be a logistic regression model. A logistic regression model can be generated by determining an appropriate set of logistic regression coefficients that are applied to predictor variables in the model. For example, input attributes in a set of training data are used as the predictor variables. The logistic regression coefficients are used to transform or otherwise map these input attributes into particular outputs in the training data (e.g., request data 128, event data 130, and/or target entity profiles 124).

Example of Using a Tree-Based Tampering-Prediction Model

As noted above, in some aspects, a tampering-prediction model (e.g. one or more of the machine learning models 118) can be a tree-based machine learning model. For example, the model-development engine 116 can retrieve an objective function from a non-transitory computer-readable medium. The objective function can be stored in the non-transitory computer-readable medium based on, for example, one or more user inputs that define, specify, or otherwise identify the objective function. In some aspects, the model-development engine 116 can retrieve the objective function based on one or more user inputs that identify a particular objective function from a set of objective functions (e.g., by selecting the particular objective function from a menu).

The model-development engine 116 can partition, for each predictor variable in a set X, a corresponding set of the predictor data samples (i.e., predictor variable values). The model-development engine 116 can determine the various partitions that maximize the objective function. The model-development engine 116 can select a partition that results in an overall maximized value of the objective function as compared to each other partition in the set of partitions. The model-development engine 116 can perform a split that results in two child node regions, such as a left-hand region $R_L$ and a right-hand region $R_R$. The model-development engine 116 can determine if a tree-completion criterion has been encountered. Examples of tree-completion criterion include, but are not limited to: the tree is built to a pre-specified number of terminal nodes; or a relative change in the objective function has been achieved. The model-development engine 116 can access one or more tree-completion criteria stored on a non-transitory computer-readable medium and determine whether a current state of the decision tree satisfies the accessed tree-completion criteria. If so, the model-development engine 116 can output the decision tree. Outputting the decision tree can include, for example, storing the decision tree in a non-transitory computer-readable medium, providing the decision tree to one or more other processes, presenting a graphical representation of the decision tree on a display device, or some combination thereof.

Regression and classification trees partition a predictor variable space into disjoint regions, $R_k$ (k=1, ..., K). Each region is assigned a representative response value $\beta_k$. A decision tree T can be specified as:

$$T(x;\Theta)=\sum_{k=1}^{K}\beta_k I(x \in R_k), \quad (15)$$

where $\Theta=\{R_k,\beta_k\}_1^K$, I(.)=1 if the argument is true and 0 otherwise, and all other variables previously defined. The parameters of Equation (15) are found by maximizing a specified objective function L:

$$\hat{\Theta}=\operatorname{argmax}_\Theta \sum_{i=1}^{n} L(y_i, T(x_i;\Theta)). \quad (16)$$

The estimates, $\hat{R}_k$, of $\hat{\Theta}$ can be computed using a greedy (i.e. choosing the split that maximizes the objective function), top-down recursive partitioning algorithm, after which estimation of $\beta_k$ is superficial (e.g., $\hat{\beta}_k = f(y_i \in \hat{R}_k)$).

A random forest model is generated by building independent trees using bootstrap sampling and a random selection of predictor variables as candidates for splitting each node. The bootstrap sampling involves sampling certain training data (e.g., predictor data samples) with replacements, so that the pool of available data samples is the same between different sampling operations. Random forest models are an ensemble of independently built tree-based models. Random forest models can be represented as:

$$F_M(x;\Omega)=q\Sigma_{m=1}^M T_m(x;\Theta_m), \quad (17)$$

where M is the number of independent trees to build, $\Omega=\{\Theta_m\}_1^M$, and q is an aggregation operator or scalar (e.g., $q=M^{-1}$ for regression), with all other variables previously defined.

To create a random forest model, the model-development engine 116 can select or otherwise identify a number M of independent trees to be included in the random forest model. For example, the number M can be stored in a non-transitory computer-readable medium accessible to the model-development engine 116, can be received by the model-development engine 116 as a user input, or some combination thereof. The model-development engine 116 can select, for each tree from 1 . . . M, a respective subset of data samples to be used for building the tree. For example, for a given set of the trees, the model-development engine 116 can execute one or more specified sampling procedures to select the subset of data samples. The selected subset of data samples is a bootstrap sample for that tree.

The model-development engine 116 can execute a tree-building algorithm to generate the tree, based on the respective subset of data samples for that tree. For instance, the model-development engine 116 can select, for each split in the tree building process, k out of p predictor variables for use in the splitting process using the specified objective function. The model-development engine 116 can combine the generated decision trees into a random forest model. For example, the model-development engine 116 can generate a random forest model $F_M$ by summing the generated decision trees according to the function $F_M(x;\hat{\Omega})=q\Sigma_{m=1}^M T_m(x;\hat{\Theta}_m)$. The model-development engine 116 can output the random forest model. Outputting the random forest model can include, for example, storing the random forest model in a non-transitory computer-readable medium, providing the random forest model to one or more other processes, presenting a graphical representation of the random forest model on a display device, or some combination thereof.

Gradient boosted machine models can also utilize tree-based models. The gradient boosted machine model can be generalized to members of the underlying exponential family of distributions. For example, these models can use a vector of responses, $y=\{y_i\}_1^n$, satisfying $$y=\mu+e, \quad (18)$$

and a differentiable monotonic link function F(.) such that $$F_M(\mu)=\Sigma_{m=1}^M T_m(x;\Theta_m), \quad (19)$$

where, m=1, . . . , M and $\Theta=\{R_k,\beta_k\}_1^K$. Equation (19) can be rewritten in a form more reminiscent of the generalized linear model as $$F_M(\mu)=\Sigma_{m=1}^M X_m\beta_m, \quad (20)$$

where, $X_m$ is a design matrix of rank k such that the elements of the $i^{th}$ column of $X_m$ include evaluations of $I(x\in R_k)$ and $\beta_m=\{\beta\}_1^K$. Here, $X_m$ and $\beta_m$ represent the design matrix (basis functions) and corresponding representative response values of the $m^{th}$ tree. Also, e is a vector of unobserved errors with $E(e|\mu)=0$ and $$cov(e|\mu)=R_\mu. \quad (21)$$

Here, $R_\mu$ is a diagonal matrix containing evaluations at $\mu$ of a known variance function for the distribution under consideration.

Estimation of the parameters in Equation (19) involves maximization of the objective function $$\hat{\Theta}=\text{argmax}_\Theta \Sigma_{i=1}^n L(y_i, \Sigma_{m=1}^M T_m(x_i;\Theta_m)). \quad (22)$$

In some cases, maximization of Equation (22) is computationally expensive. An alternative to direct maximization of Equation (22) is a greedy stage-wise approach, represented by the following function:

$$\hat{\Theta}=\text{argmax}_\Theta \Sigma_{i=1}^n L(y_i, T_m(x_i;\Theta_m)+\nu). \quad (23)$$

Thus, $$F_m(\mu)=T_m(x;\Theta_m)+\nu, \quad (24)$$

where, $\nu=\Sigma_{j=1}^{m-1} F_j(\mu)=\Sigma_{j=1}^{m-1} T_j(x;\Theta_j)$.

Methods of estimation for the generalized gradient boosting model at the $m^{th}$ iteration are analogous to estimation in the generalized linear model. Let $\hat{\Theta}_m$ be known estimates of $\Theta_m$ and $\hat{\mu}$ is defined as $$\hat{\mu}=F_m^{-1}[T_m(x;\hat{\Theta}_m)+\nu]. \quad (25)$$

Letting $$z=F_m(\hat{\mu})+F_m'(\hat{\mu})(y-\hat{\mu})-\nu, \quad (26)$$

then, the following equivalent representation can be used:

$$z|\Theta_m \sim N[T_m(x;\Theta_m), F_m'(\hat{\mu})R_{\hat{\mu}} F_m'(\hat{\mu})]. \quad (27)$$

Letting $\Theta_m$ be an unknown parameter, this takes the form of a weighted least squares regression with diagonal weight matrix $$\hat{W}=R_{\hat{\mu}}^{-1}[F'(\hat{\mu})]^{-2}. \quad (28)$$

Table 1 includes examples of various canonical link functions $\hat{W}=R_{\hat{\mu}}$.

TABLE 1

| Distribution | F (μ) | Weight |
| --- | --- | --- |
| Binomial | log[μ/(1 − μ)] | μ(1 − μ) |
| Poisson | log(μ) | μ |
| Gamma | $\mu^{-1}$ | $\mu^{-2}$ |
| Gaussian | μ | 1 |

The response z is a Taylor series approximation to the linked response F(y), and is analogous to the modified dependent variable used in iteratively reweighted least squares. The objective function to maximize corresponding to the model for z is $$L(\Theta_m, R; z) = \qquad (29)$$
$$-\frac{1}{2}\log|\phi V| - \frac{1}{2\phi}(z - T_m(s;\Theta_m))^T V^{-1}(z - T_m(x;\Theta_m)) - \frac{n}{2}\log(2\pi),$$

where, $V=W^{-1/2}R_\mu W^{-1/2}$ and $\phi$ is an additional scale/dispersion parameter. Estimation of the components in Equation (19) are found in a greedy forward stage-wise fashion, fixing the earlier components.

To create a gradient boosted machine model, the model-development engine 116 can identify a number of trees for a gradient boosted machine model and specify a distributional assumption and a suitable monotonic link function for the gradient boosted machine model. The model-development engine 116 can select or otherwise identify a number M of independent trees to be included in the gradient boosted machine model and a differentiable monotonic link function F(.) for the model. For example, the number M and the function F(.) can be stored in a non-transitory computer-readable medium accessible to the model-development engine 116, can be received by the model-development engine 116 as a user input, or some combination thereof.

The model-development engine 116 can compute an estimate of $\mu$, $\hat{\mu}$ from the training data or an adjustment that permits the application of an appropriate link function (e.g. $\hat{\mu}=n^{-1}\Sigma_{i=1}{}^n y_i$), set $v_0=F_0(\mu)$, and define $R_{\hat{\mu}}$. The model-development engine 116 can generate each decision tree using an objective function such as a Gaussian log likelihood function (e.g., Equation 15). The model-development engine 116 can regress z to x with a weight matrix $\hat{W}$. This regression can involve estimating the $\Theta_m$ that maximizes the objective function in a greedy manner. The model-development engine 116 can update $v_m=v_{m-1}+T_m(x;\hat{\Theta}_m)$ and setting $\hat{\mu}=F_m{}^{-1}(v_m)$. The model-development engine 116 can execute this operation for each tree. The model-development engine 116 can output a gradient boosted machine model. Outputting the gradient boosted machine model can include, for example, storing the gradient boosted machine model in a non-transitory computer-readable medium, providing the gradient boosted machine model to one or more other processes, presenting a graphical representation of the gradient boosted machine model on a display device, or some combination thereof.

In some aspects, the tree-based machine learning model for each time bin is iteratively adjusted to enforce monotonicity with respect to output values associated with the terminal nodes of the decision trees in the model. For instance, the model-development engine 116 can determine whether values in the terminal nodes of a decision tree have a monotonic relationship with respect to one or more predictor variables in the decision tree. In one example of a monotonic relationship, the predicted response increases as the value of a predictor variable increases (or vice versa). If the model-development engine 116 detects an absence of a required monotonic relationship, the model-development engine 116 can modify a splitting rule used to generate the decision tree. For example, a splitting rule may require that data samples with predictor variable values below a certain threshold value are placed into a first partition (i.e., a left-hand side of a split) and that data samples with predictor variable values above the threshold value are placed into a second partition (i.e., a right-hand side of a split). This splitting rule can be modified by changing the threshold value used for partitioning the data samples.

A model-development engine 116 can also train an unconstrained tree-based machine learning model by smoothing over the representative response values. For example, the model-development engine 116 can determine whether values in the terminal nodes of a decision tree are monotonic. If the model-development engine 116 detects an absence of a required monotonic relationship, the model-development engine 116 can smooth over the representative response values of the decision tree, thus enforcing monotonicity. For example, a decision tree may require that the predicted response increases if the decision tree is read from left to right. If this restriction is violated, the predicted responses can be smoothed (i.e., altered) to enforce monotonicity.

Computing System Example

Figure 6:
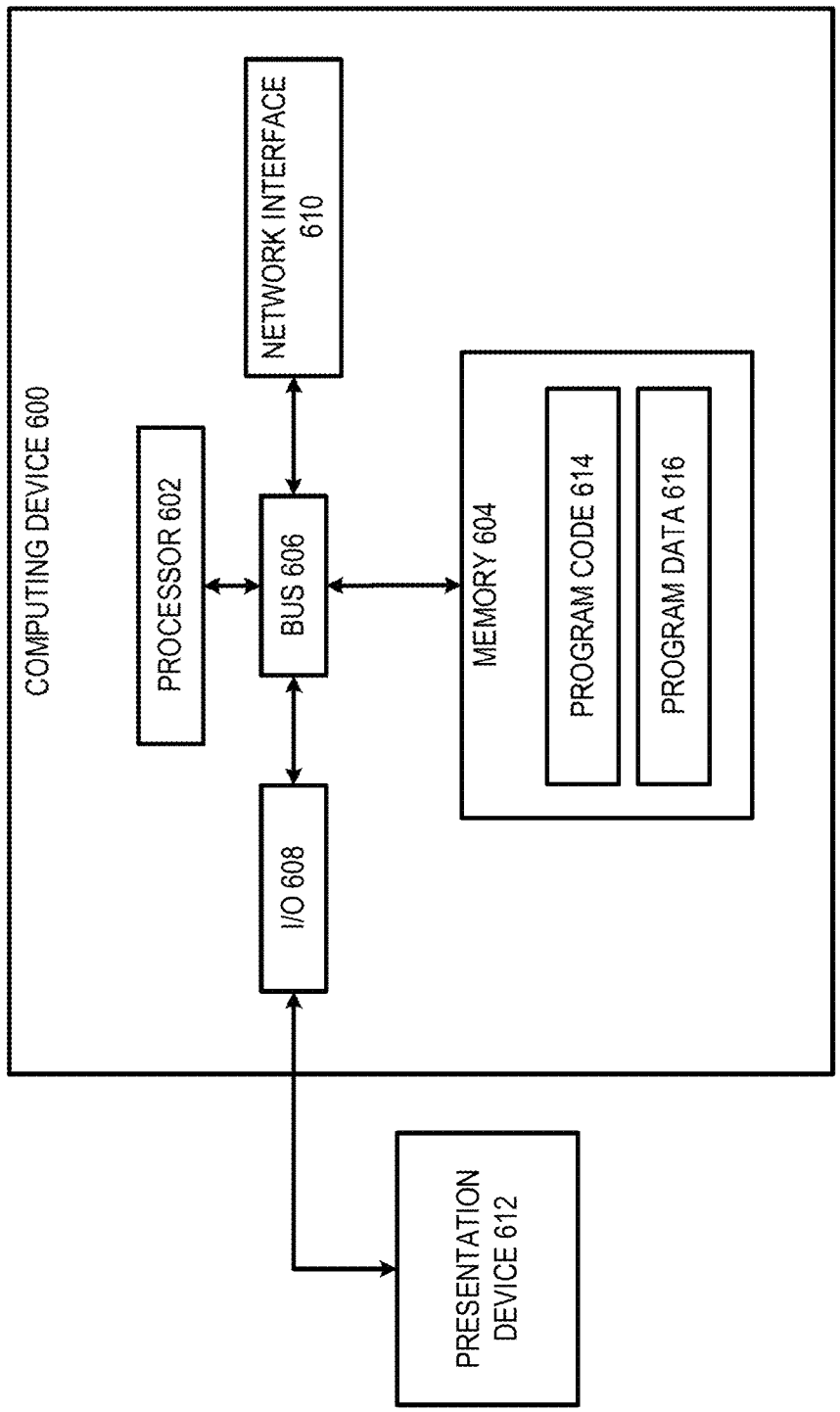
FIG. 6 depicts an example of a computing system suitable for implementing aspects of the techniques and technologies presented herein.

Any suitable computing system or group of computing systems can be used to perform the operations described herein. For example, FIG. 6 is a block diagram depicting an example of a computing system 600 that can be used to implement one or more of the systems depicted in FIG. 1 (e.g., a tampering prediction server 110, a client computing system 104, etc.). The example of the computing system 600 can include various devices for communicating with other devices in the computing system 100, as described with respect to FIG. 1. The computing system 600 can include various devices for performing one or more of the operations described above.

The computing system 600 can include a processor 602, which includes one or more devices or hardware components communicatively coupled to a memory 604. The processor 602 executes computer-executable program code 605 stored in the memory 604, accesses program data 607 stored in the memory 604, or both. Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing system 600 can execute program code 605. The program code 605 may be stored in any suitable computer-readable medium, and may be executed on any suitable processing device. For example, as depicted in FIG. 6, the program code for the model-development engine 116 can reside in the memory 604 at the computing system 600. Executing the program code 605 can configure the processor 602 to perform one or more of the operations described herein.

Program code 605 stored in a memory 604 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, and network transmission, among others. Examples of the program code 605 include one or more of the applications, engines, or sets of program code described herein, such as a model-development engine 116, a client portal 121, machine learning models 118, etc.

Examples of program data 607 stored in a memory 604 may include one or more databases, one or more other data structures, datasets, etc. For instance, if a memory 604 is a may include tampering prediction database 122 storing target entity profiles 124, request data 128, and event data 130.

The computing system 600 may also include a number of external or internal devices such as input or output devices. For example, the computing system 600 is shown with an input/output interface 608 that can receive input from input devices or provide output to output devices. A bus 606 can also be included in the computing system 600. The bus 606 can communicatively couple one or more components of the computing system 600.

In some aspects, the computing system 600 can include one or more output devices. One example of an output device is the network interface device 610 depicted in FIG. 6. A network interface device 610 can include any device or group of devices suitable for establishing a wired or wireless data connection to one or more data networks (e.g., network 108). Non-limiting examples of the network interface device 610 include an Ethernet network adapter, a modem, etc. Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A system comprising a server computer comprising:
one or more processors;
one or more non-transitory memories coupled to the one or more processors, the one or more memories storing:
a database comprising event data for a plurality of historical actions that were allegedly performed by a respective plurality of target individuals, wherein the historical actions comprise one or more of credit instruments applied for, purchases made, or fraudulent transactions conducted; and
a plurality of instructions executable by the one or more processors, the plurality of instructions comprising instructions that when executed by the one or more processors cause the one or more processors to perform processing comprising:
receiving a request from a target individual to modify event data for a historical action, the request comprising information about the target individual and information about the historical action, wherein the request corresponds to a contention that the target individual did not perform the action;
generating a first security assessment score by, at least, applying a first set of machine learning models to the information about the target individual obtained from the request, the information about the historical action, and information about the target individual obtained from the database;
retrieving, from the database, event data associated with prior event data modification requests made by the target individual, wherein the prior event data modification requests correspond to contentions that additional event data is inaccurate;
computing a second security assessment score by, at least, applying a second machine learning model to the retrieved event data, wherein the second machine learning model has been trained using labeled training data of the event data, and wherein the second machine learning model is augmented with an optimization model that has been trained using unlabeled training data of the event data;
generating an overall security assessment score for the request based on the first security assessment score and the second security assessment score, wherein the overall security assessment score indicates whether the request to modify the event data corresponds to credit washing; and
providing the overall security assessment score for the request to a client computer; and the client computer, wherein the client computer is configured for preventing, based on the overall security assessment score, the target individual from accessing a resource.

2. The system of claim 1, wherein preventing the target individual from accessing the resource includes one or more of: preventing the target individual from accessing a secure database, preventing the target individual from accessing a secured portion of a website, or preventing the target individual from accessing a particular tool in an online environment.

3. The system of claim 1, the processing further comprising training the second machine learning model by
   obtaining the labeled training data;
   training the second machine learning model using the labeled training data;
   obtaining the unlabeled training data;
   training the optimization model using the unlabeled training data; and
   optimizing hyperparameters of the second machine learning model using the optimization model.

4. The system of claim 1, the processing further comprising:
   identifying, from the database, additional historical event data associated with the outcome of prior requests made by the target individual;
   applying a third machine learning model to the additional historical event data to compute a third security assessment score, wherein the third machine learning model has been trained using the labeled training data, and wherein the third machine learning model is augmented with a second optimization model that has been trained using the unlabeled training data; and
   wherein the third machine learning model further bases the overall security assessment score on the third security assessment score.

5. The system of claim 1, wherein:
   the request further includes information about a location of origin of the request; and
   applying the first set of machine learning models to generate the first security assessment score further comprises:
      applying a fourth machine learning model to the location information to generate first risk signals; and
      applying a fifth machine learning model to the information about the target individual obtained from the database and the information about the target individual obtained from the request to generate second risk signals;
      wherein the first security assessment score is generated by applying a sixth machine learning model to the first risk signals and the second risk signals.

6. The system of claim 5, wherein:
   the information about the historical action includes a narrative description of the historical action; and
   applying the first set of machine learning models to generate the first security assessment score further comprises:
   executing optical character recognition on the narrative description of the historical action to extract information from the narrative description of the historical action; and
      performing natural language processing on the extracted information to generate third risk signals, wherein the first security assessment score is further based on the third risk signals.

7. The system of claim 5, wherein:
   the request further includes a supplemental document; and
   applying the first set of machine learning models to generate the first security assessment score further comprises:
   executing optical character recognition on the supplemental document to extract information from the supplemental document; and
      based on the information extracted from the supplemental document, generating fourth risk signals,
      wherein the first security assessment score is further based on the fourth risk signals.

8. The system of claim 5, wherein:
   the sixth machine learning model has been trained using labeled risk signal data, and wherein the sixth machine learning model is augmented with an optimization model that has been trained using unlabeled risk signal data.

9. A computer-implemented method comprising:
   receiving, by a server computer, a request from a target individual to modify event data for a historical action, of a plurality of historical actions that were allegedly performed by a respective plurality of target individuals stored to a database, wherein the historical actions comprise one or more of credit instruments applied for, purchases made, or fraudulent transactions conducted, the request comprising information about the target individual and information about the historical action, wherein the request corresponds to a contention that the target individual did not perform the action;
   generating, by the server computer, a first security assessment score by, at least, applying a first set of machine learning models to the information about the target individual obtained from the request, the information about the historical action, and information about the target individual obtained from the database;
   retrieving, by the server computer from the database, event data associated with prior requests made by the target individual, wherein the prior requests correspond to a contention that additional event data is inaccurate;
   computing, by the server computer, a second security assessment score by at least applying a second machine learning model to the retrieved event data associated with the prior requests made by the target individual, wherein the second machine learning model has been trained using labeled training data of the event data, and wherein the second machine learning model is augmented with an optimization model that has been trained using unlabeled training data of the event data;
   generating, by the server computer, an overall security assessment score for the request based on the first security assessment score and the second security assessment score, wherein the overall security assessment score indicates whether the request to modify the event data corresponds to credit washing; and
   providing, by the server computer, the overall security assessment score for the request to a client computer, wherein the overall security assessment score is usable by the client computer for preventing the target individual from accessing a resource.

10. The method of claim 9, wherein preventing the target individual from accessing the resource includes one or more of: preventing the target individual from accessing a secure database, preventing the target individual from accessing a secured portion of a website, or preventing the target individual from accessing a particular tool in an online environment.

11. The method of claim 9, further comprising
determining, by the client computer, that the overall security assessment score exceeds a threshold value; and
based on the determination that the overall security assessment score exceeds the threshold value, preventing, by the client computer, the target individual from accessing the resource.

12. The method of claim 9, further comprising training the second machine learning model by:
obtaining the labeled training data;
training the second machine learning model using the labeled training data;
obtaining the unlabeled training data;
training the optimization model using the unlabeled training data; and
optimizing hyperparameters of the second machine learning model using the optimization model.

13. The method of claim 9, further comprising:
identifying, from the database, additional historical event data associated with the outcome of prior requests made by the target individual;
applying a third machine learning model to the additional historical event data to compute a third security assessment score, wherein the third machine learning model has been trained using the labeled training data, and wherein the third machine learning model is augmented with a second optimization model that has been trained using the unlabeled training data; and
wherein the third machine learning model further bases the overall security assessment score on the third security assessment score.

14. The method of claim 9, wherein:
the request further includes information about a location of origin of the request; and
applying the first set of machine learning models to generate the first security assessment score further comprises:
applying a fourth machine learning model to the location information to generate first risk signals; and
applying a fifth machine learning model to the information about the target individual obtained from the database and the information about the target individual obtained from the request to generate second risk signals;
wherein the first security assessment score is generated by applying a sixth machine learning model to the first risk signals and the second risk signals.

15. The method of claim 14, wherein:
the information about the historical action includes a narrative description of the historical action; and
applying the first set of machine learning models to generate the first security assessment score further comprises:
executing optical character recognition on the narrative description of the historical action to extract information from the narrative description of the historical action; and
performing natural language processing on the extracted information to generate third risk signals, wherein the first security assessment score is further based on the third risk signals.

16. The method of claim 14, wherein:
the request further includes a supplemental document; and
applying the first set of machine learning models to generate the first security assessment score further comprises:
executing optical character recognition on the supplemental document to extract information from the supplemental document; and
based on the information extracted from the supplemental document, generating fourth risk signals,
wherein the first security assessment score is further based on the fourth risk signals.

17. A non-transitory computer-readable medium storing program code executable by one or more processing devices, wherein the program code, when executed by the one or more processing devices, configures the one or more processing devices to perform operations comprising:
receiving a request from a target individual to modify event data for a historical action, of a plurality of historical actions that were allegedly performed by a respective plurality of target individuals stored to a database, wherein the historical actions comprise one or more of credit instruments applied for, purchases made, or fraudulent transactions conducted, the request comprising information about the target individual and information about the historical action, wherein the request corresponds to a contention that the target individual did not perform the action;
generating a first security assessment score by, at least, applying a first set of machine learning models to the information about the target individual obtained from the request, the information about the historical action, and information about the target individual obtained from the database;
retrieving, from the database, event data associated with prior requests made by the target individual, wherein the prior requests correspond to a contention that additional event data is inaccurate;
computing a second security assessment score by, at least, applying a second machine learning model to the retrieved event data associated with the prior requests made by the target individual, wherein the second machine learning model has been trained using labeled training data of the event data, and wherein the second machine learning model is augmented with an optimization model that has been trained using unlabeled training data of the event data;
generating an overall security assessment score for the request based on the first security assessment score and the second security assessment score, wherein the overall security assessment score indicates whether the request to modify the event data corresponds to credit washing; and
providing the overall security assessment score for the request to a client computer.

18. The non-transitory computer-readable medium of claim 17, the operations further comprising training the second machine learning model by:
obtaining the labeled training data;
training the second machine learning model using the labeled training data;
obtaining the unlabeled training data;
training the optimization model using the unlabeled training data; and
optimizing hyperparameters of the second machine learning model using the optimization model.

19. The non-transitory computer-readable medium of claim 17, the operations further comprising:
identifying, from the database, additional historical event data associated with the outcome of prior requests made by the target individual;

applying a third machine learning model to the additional historical event data to compute a third security assessment score, wherein the third machine learning model has been trained using the labeled training data, and wherein the third machine learning model is augmented with a second optimization model that has been trained using the unlabeled training data; and wherein the third machine learning model further bases the overall security assessment score on the third security assessment score.

20. The non-transitory computer-readable medium of claim 17, wherein:

the request further includes information about a location of origin of the request; and applying the first set of machine learning models to generate the first security assessment score further comprises:

applying a fourth machine learning model to the location information to generate first risk signals; and applying a fifth machine learning model to the information about the target individual obtained from the database and the information about the target individual obtained from the request to generate second risk signals, wherein the first security assessment score is generated by applying a sixth machine learning model to the first risk signals and the second risk signals.

* * * * *